(12) United States Patent
Younce et al.

(10) Patent No.: US 10,524,031 B2
(45) Date of Patent: Dec. 31, 2019

(54) METHODS AND APPARATUS FOR PROVIDING CONFIGURATION DISCOVERY USING INTRA-NODAL TEST CHANNEL

(71) Applicant: Tellabs Operations, Inc., Naperville, IL (US)

(72) Inventors: Richard Y. Younce, Yorkville, IL (US); Yajun Wang, Naperville, IL (US); Julia Y Larikova, Naperville, IL (US); Rafid Sukkar, Aurora, IL (US)

(73) Assignee: Tellabs Operations, Inc., Naperville, IL (US)

( * ) Notice: Subject to any disclaimer, the term of this patent is extended or adjusted under 35 U.S.C. 154(b) by 0 days.

(21) Appl. No.: 16/004,221

(22) Filed: Jun. 8, 2018

(65) Prior Publication Data

US 2018/0295430 A1    Oct. 11, 2018

Related U.S. Application Data

(62) Division of application No. 14/281,122, filed on May 19, 2014, now Pat. No. 10,009,671.

(Continued)

(51) Int. Cl.
*H04B 10/071* (2013.01)
*H04Q 11/00* (2006.01)
(Continued)

(52) U.S. Cl.
CPC ....... *H04Q 11/0066* (2013.01); *H04B 10/071* (2013.01); *H04B 10/0773* (2013.01); *H04B 10/0791* (2013.01); *H04J 14/0206* (2013.01); *H04J 14/0212* (2013.01); *H04J 14/0217* (2013.01); *H04J 14/0267* (2013.01);
(Continued)

(58) Field of Classification Search
CPC .......... G02B 6/26; H04B 10/07; H04B 10/08; H04B 17/00; H04B 10/071; H04B 10/0773; H04B 10/0791; H04J 14/00; H04J 14/02; H04J 14/0206; H04J 14/0212; H04J 14/0217; H04J 14/0267; H04J 14/0275;
(Continued)

(56) References Cited

U.S. PATENT DOCUMENTS 6,141,125 A * 10/2000 Blair ................. H04B 10/0773
                                                    385/24
6,990,294 B2 * 1/2006 Ikoma .................... H04B 10/00
                                                    396/26

(Continued)

*Primary Examiner* — Abbas H Alagheband
(74) *Attorney, Agent, or Firm* — JW Law Group; James M. Wu

(57) ABSTRACT

Method and apparatus of an optical routing system ("ORS") capable of automatically discovering intra-nodal fiber connections using a test channel transceiver ("TCT") are disclosed. ORS, in one embodiment, includes a set of reconfigurable optical add-drop multiplexer ("ROADM") modules, intra-nodal fiber connections, add-drop modules, and a test module. The ROADM modules are able to transmit or receive optical signals via optical fibers. The intra-nodal fiber connections are configured to provide optical connections. The add-drop modules are able to selectively make connections between input ports and output ports. The test module containing TCT is configured to identify at least a portion of intra-nodal connections of the ROADM via a test signal operating with a unique optical frequency.

17 Claims, 17 Drawing Sheets

Related U.S. Application Data

(60) Provisional application No. 61/928,695, filed on Jan. 17, 2014.

(51) Int. Cl.
*H04J 14/02* (2006.01)
*H04B 10/079* (2013.01)
*H04B 10/077* (2013.01)

(52) U.S. Cl.
CPC .. *H04J 14/0275* (2013.01); *H04Q 2011/0015* (2013.01); *H04Q 2011/0083* (2013.01)

(58) Field of Classification Search
CPC ....... H04Q 11/0066; H04Q 2011/0015; H04Q 2011/0083
USPC .......................................... 398/21, 48, 19, 34
See application file for complete search history.

(56) References Cited

U.S. PATENT DOCUMENTS

| | | | | |
|---|---|---|---|---|
| 7,254,327 B1* | 8/2007 | Zhong | ............... | H04B 10/0775 398/33 |
| 7,426,347 B2* | 9/2008 | Hnatiw | ............... | G01J 3/28 385/16 |
| 7,440,649 B2* | 10/2008 | Sakai | ............... | G02B 6/356 385/16 |
| 7,711,267 B2* | 5/2010 | Wellbrock | ............... | H04L 43/0847 398/17 |
| 8,401,386 B2* | 3/2013 | Izumi | ............... | H04J 14/02 398/33 |
| 8,428,461 B2* | 4/2013 | Boduch | ............... | H04J 14/0204 398/68 |
| 8,447,183 B2* | 5/2013 | Boduch | ............... | H04J 14/0201 396/83 |
| 8,509,621 B2* | 8/2013 | Boertjes | ............... | H04J 14/0212 398/83 |
| 8,774,632 B2* | 7/2014 | Archambault | ............... | H04J 14/02 370/254 |
| 8,903,240 B2* | 12/2014 | Ghioni | ............... | H04J 14/0219 398/48 |
| 9,660,755 B2* | 5/2017 | Hurley | ............... | H04J 14/021 |
| 2002/0012143 A1* | 1/2002 | Graves | ............... | H04Q 11/0005 398/87 |
| 2002/0097460 A1* | 7/2002 | Ikoma | ............... | H04B 10/00 398/9 |
| 2003/0210387 A1* | 11/2003 | Saunders | ............... | H04B 10/071 356/73 |
| 2010/0221004 A1* | 9/2010 | Haslam | ............... | H04J 14/0201 398/49 |
| 2011/0085801 A1* | 4/2011 | Palacharla | ............... | H04J 14/0212 398/48 |
| 2011/0200324 A1* | 8/2011 | Boertjes | ............... | H04J 14/0212 398/16 |
| 2011/0262142 A1* | 10/2011 | Archambault | ............... | H04J 14/02 398/83 |
| 2014/0072296 A1* | 3/2014 | Montalvo Garcia | ............... | G01M 11/3127 398/16 |
| 2014/0112658 A1* | 4/2014 | Hurley | ............... | H04J 14/021 398/28 |

* cited by examiner

US 10,524,031 B2

METHODS AND APPARATUS FOR PROVIDING CONFIGURATION DISCOVERY USING INTRA-NODAL TEST CHANNEL

PRIORITY

This application is a divisional application of U.S. patent application Ser. No. 14/281,122, filed on May 19, 2014 in the name of the same inventor and entitled "Methods and Apparatus for Providing Configuration Discovery Using Intra-Nodal Test Channel," which further claims the benefit of priority based upon U.S. Provisional Patent Application Ser. No. 61/928,695, filed on Jan. 17, 2014 in the name of the same inventors and having a title of "Intra Nodal Optical Test Channel for Configuration Discovery and Interconnect Diagnostics in an Optical Node." All mentioned U.S. applications are hereby incorporated by reference.

FIELD

The exemplary embodiment(s) of the present invention relates to telecommunications network. More specifically, the exemplary embodiment(s) of the present invention relates to optical networking.

BACKGROUND

With increasing demand for more information to be supplied to homes and/or businesses, many network communication providers are adding, expanding, upgrading, and/or switching their networks to optical communications network(s). Optical communications networks typically offer high-speed voice, video, and data transmission between providers and homes as well as businesses and network to network. Conventional exemplary optical networks include fiber to the node/neighborhood ("FTTN"), fiber to the curb ("FTTC"), fiber to the building ("FTTB"), fiber to the home ("FTTH"), fiber to the premises ("FTTP"), or other edge location to which a fiber network extends. Other exemplary optical networks may, for example, carry data traffic within a city or from city to city. At least a portion of the data traffic may then be sent to its destination via, for example, one of the above mentioned local optical networks (FTTN, FTTC, FTTB, FTTH, FTTP). Various networks may use, for example, wave-division multiplexing (WDM) for carrying its data traffic.

To route optical signals between various optical nodes or devices, a wavelength-division multiplexing ("WDM") system is employed in a fiber-optic communication network to handle optical routing. The WDM system, for example, is able to multiplex a number of optical signals with different wavelengths onto a single optical fiber. A wavelength may also be referred as a frequency or a color. Different wavelengths, for instance, can be generated by using different lasers capable of generating unique wavelength of optical light. With a WDM network environment, a typical fiber can be configured to carry multiple sets of network traffic using different traffic wavelengths.

A conventional network includes multiple nodes wherein each node typically couples to other nodes via one or more optical fibers. Since each fiber or optical fiber can carry multiple sets of frequencies or degrees of data traffic, inter-office fiber optic cabling at the node can be messy and/or complicated. For example, a typical optical node can be configured to handle up to 20 degrees and each degree of node connection requires multiple fibers or fiber jumpers to route or process optical signals. As such, hundreds if not thousands of optical fiber jumpers are deployed to route the signals to various optical modules.

A problem associated with correctly connecting between intra-nodal (or inter-nodal) optical modules is that the connections using voluminous fiber jumpers tend to be error prone and/or complicated. For example, correctly connecting and/or diagnosing fiber connection takes time and resources. Another drawback is that the installing and maintaining large number of fibers and/or jumpers can be operationally challenging.

SUMMARY

One embodiment of the present invention discloses an optical routing system ("ORS") that is capable of automatically discovering intra-nodal fiber connections using a test channel transceiver ("TCT"). The ORS, in one aspect, includes a set of reconfigurable optical add-drop multiplexer ("ROADM") modules, intra-nodal fiber connections, add-drop modules, and a test module. The ROADM modules are able to transmit or receive optical signals to and from other modules via connected optical fibers. The intra-nodal fiber connections provide optical connections between intra-nodal optical modules using fibers and/or jumpers. The add-drop modules are able to selectively make connections between input ports and output ports of optical modules such as transponders and ROADM modules. The test module containing TCT is configured to identify at least a portion of intra-nodal connections via a test signal operating with a unique optical wavelength.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
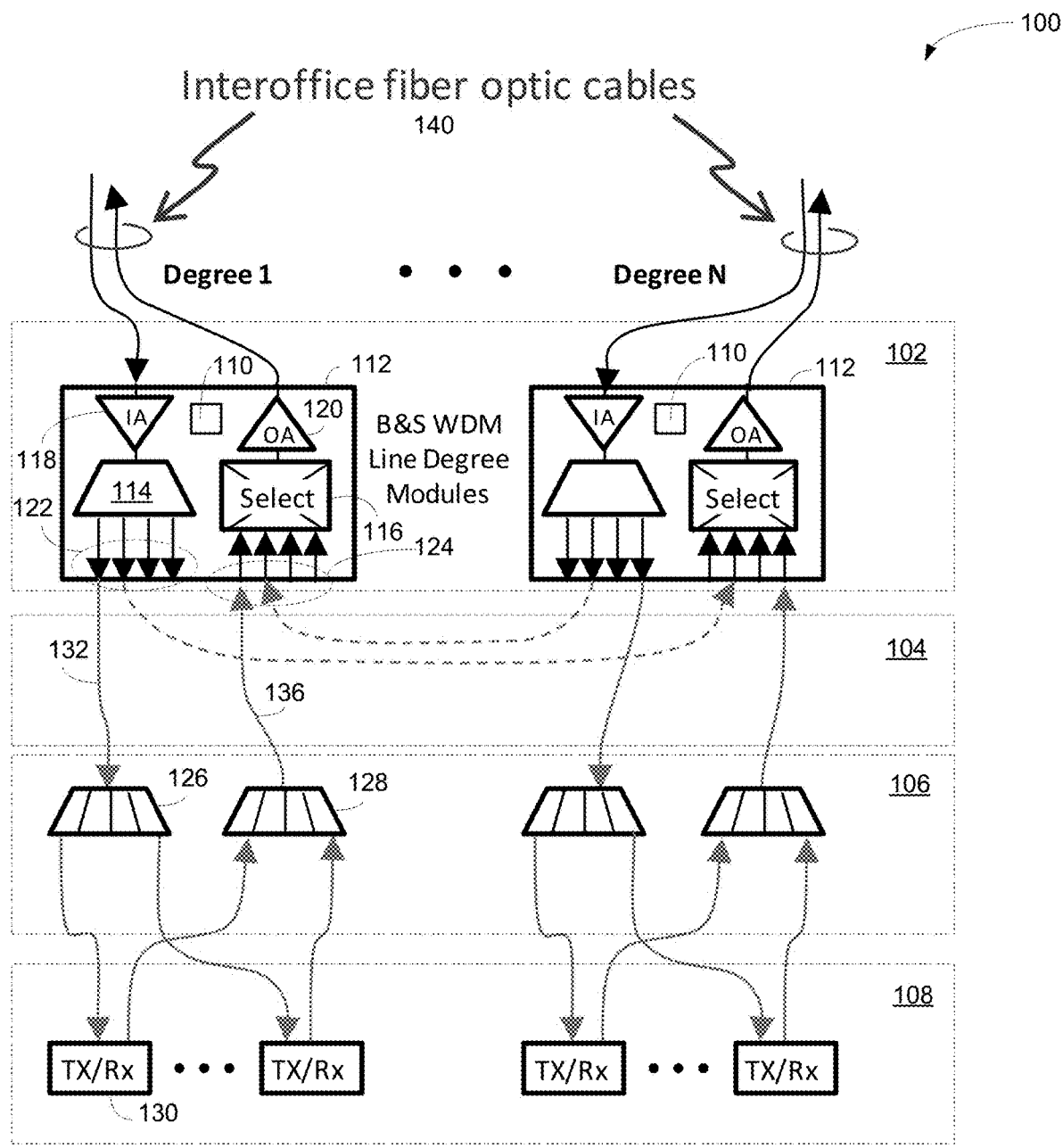
FIG. 1 is a block diagram illustrating an optical routing system containing a test channel transceiver ("TCT") in accordance with one embodiment of the present invention.

Exemplary embodiment(s) of the present invention is described herein the context of a method and/or apparatus for discovering ports configuration and diagnosing port connection.

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

The term "system" or "device" is used generically herein to describe any number of components, elements, subsystems, devices, packet switch elements, packet switches, access switches, routers, networks, computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

Communication network means any type of network that is able to transmit data in a form of packets, cells, or frames. A communication network may be, for example, an IP communication network or an IP network carrying traffic packed in cells such as ATM (Asynchronous Transfer Mode) type, on a transport medium, for example, the TCP/IP or UDP/IP type. ATM cells are the result of decomposition (or segmentation) of packets of data, IP type, and those packets (here IP packets) comprise an IP header, a header specific to the transport medium (for example UDP or TCP) and payload data. The IP network may also include a satellite network, a DVB-RCS (Digital Video Broadcasting-Return Channel System) network, providing Internet access via satellite, or an SDMB (Satellite Digital Multimedia Broadcast) network, a terrestrial network, a cable (xDSL) network or a mobile or cellular network (GPRS/EDGE, or UMTS (where applicable of the MBMS (Multimedia Broadcast/Multicast Services) type, or the evolution of the UMTS known as LTE (Long Term Evolution), or DVB-H (Digital Video Broadcasting-Handhelds)), or a hybrid (satellite and terrestrial) network.

One embodiment of the present invention discloses an optical routing system ("ORS") that is capable of automatically discovering intra-nodal fiber connections using a test channel transceiver ("TCT"). The ORS, in one aspect, includes a set of reconfigurable optical add-drop multiplexer ("ROADM") modules, intra-nodal fiber connections, add-drop modules, and a test module. The ROADM modules are able to transmit or receive optical signals to and from other modules via connected optical fibers. The intra-nodal fiber connections provide optical connections between intra-nodal optical modules using fibers and/or jumpers. The add-drop modules are able to selectively add and/or drop make connections between input ports and output ports of optical modules such as transponders and ROADM modules. These and other modules in a communication network that can receive and/or transmit optical signals may be referred to as optical modules. The test module containing TCT is configured to identify at least a portion of intra-nodal connections via a test signal using a unique optical wavelength. The test signal may also be referred to as a test frequency or test wavelength.

FIG. 1 is a block diagram 100 illustrating an ORS containing a line system 102, intra-nodal fiber connections 104, add-drop subsystems 106, and local transponders 108 in accordance with one embodiment of the present invention. Line system 102, in one embodiment, includes one or more test channel transceivers ("TCTs") 110 capable of discovering and/or verifying various port interconnections. It should be noted that the underlying concept of the exemplary embodiment(s) of the present invention would not change if one or more components (or elements) were added to or removed from diagram 100.

Line system 102, in one embodiment, includes one or more broadcast and select wavelength divisional multiplexing ("B&S WDM") line modules 112 for routing or distributing optical signals. Optical signals include light wavelengths, frequencies, light beams, photon energy, and/or optical traffic. Each B&S WDM line module 112, also known as line module, includes a passive coupler or splitter 114, a wavelength select switch ("WSS") 116, a line input amplifier ("IA") 118, and a line output amplifier ("OA") 120. In one example, the amplifier such as an Erbium Doped Fiber Amplifier ("EDFA") is used for the line output amplifier 120 and/or line input amplifier 118. Note that the line output amplifier 120 is used to transmit an optical signal from line module 112. The line input is configured to allow an optical signal to enter line module 112. A function of passive coupler 114 is to receive multiplexed signal(s), wavelengths, or frequencies from IA 118 and subsequently forward the received signal(s) to various output ports 122. Select WSS 116 is configured to receive various signals or frequencies from input ports 124 and subsequently forwards a multiplexed optical signal to other optical modules via OA 120.

Intra-nodal fiber connections 104, in one aspect, include multiple optical fibers and/or optical fiber jumpers used for coupling various input and output ("I/O") ports between optical modules. In one example, intra-nodal fiber connections 104 include hundreds and thousands of optical fibers and/or jumpers for connecting and/or cabling I/O ports located at the same or different optical modules. To simplify the connections, a sorting device such as fiber shuffle may be used to simplify the fiber cabling and/or connecting.

Add-drop subsystem 106 illustrates multiple arrayed waveguides ("AWGs") 126 configured to provide fixed add and drop based optical routing function. It should be noted that optical routing function also ties to specific degree and wavelength. For example, AWG 126 is able to distribute or route different optical signals with different wavelengths upon receipt of an optical signal. The outputs from AWG 126 are fed to one or more transponders 130 based on a received optical signal such as signal 132. Note that signal 132 can be a multiplexed optical light containing multiple sets of data. Alternatively, AWG 128 is also capable of receiving multiple different optical signals or frequencies wherein the multiple signals are multiplexed into one multiplexed signal 136 which is subsequently forwarded to one of input ports 124 of line module 112 via intra-nodal fiber connections 104.

Local transponders 108 include multiple transponders 130 wherein each transponder 130 contains at least one pair of transmitter and receiver. In one aspect, transponder 130 is a wavelength-converting component that is able to convert data signals between optical and electrical signals. In one example, transponders 130 are physically situated closer to the end users. Alternatively, transponders 130 are able to separate multi-wavelength optical signal into individual data signals.

Diagram 100 illustrates a layout for a reconfigurable optical add-drop multiplexer ("ROADM") node which is used in a WDM network environment. The WDM network, for example, is able to handle at least 10 gigabits optical data transmission on a dispersion-managed fiber plant. Diagram 100 illustrates an N degree ROADM coupling to other ROADM modules in the network via fiber optic cables to N distant nodes, wherein N is an integer. Optical channels on interoffice fibers 140 may be dropped at local transponders 108 or expressed to some other degree, such as "pass through", "transit", switching of "express traffic", or the like.

All fiber connections are usually symmetric in the WDM network. One fiber is used to transmit signal traveling in one direction and a second fiber is used to receive traffic traveling in the opposite direction. Similarly, every transponder 130 is able to perform transmitting and receiving functions. Transponders 130 are connected to line modules 112 via add-drop subsystems such as subsystems 126 and 128. Note that add-drop subsystem 126 or 128 includes fixed filtered AWG component which is directed to a specific degree. In one example, the ROADM node illustrated in diagram 100 can be described as "colored and directional" data distribution or routing. The colored and directional optical signal or data routing means that a transponder plugged into a specific port of AWG can communicate with line system 102 at one specific wavelength (or color) and one specific end office (direction).

TCT 110, in one embodiment, includes a test transmitter and a test receiver wherein the test transmitter is able to generate a test signal which is different from the traffic signal. In one aspect, the test signal contains one or more identifications ("IDs") which identify line module(s) such as line module 112. For example, a test signal composed with a line module ID broadcasts the ID to all connected optical modules. After receiving one or more test signals from connected optical modules, the connectivity to other optical modules can be determined based on the received test signals which include IDs of connected optical modules.

The TCT 110 can, for example, automatically discover connected optical modules using a unique test signal. Also, TCT is able to provide interconnect diagnosis to verify ports connections.

Figure 2:
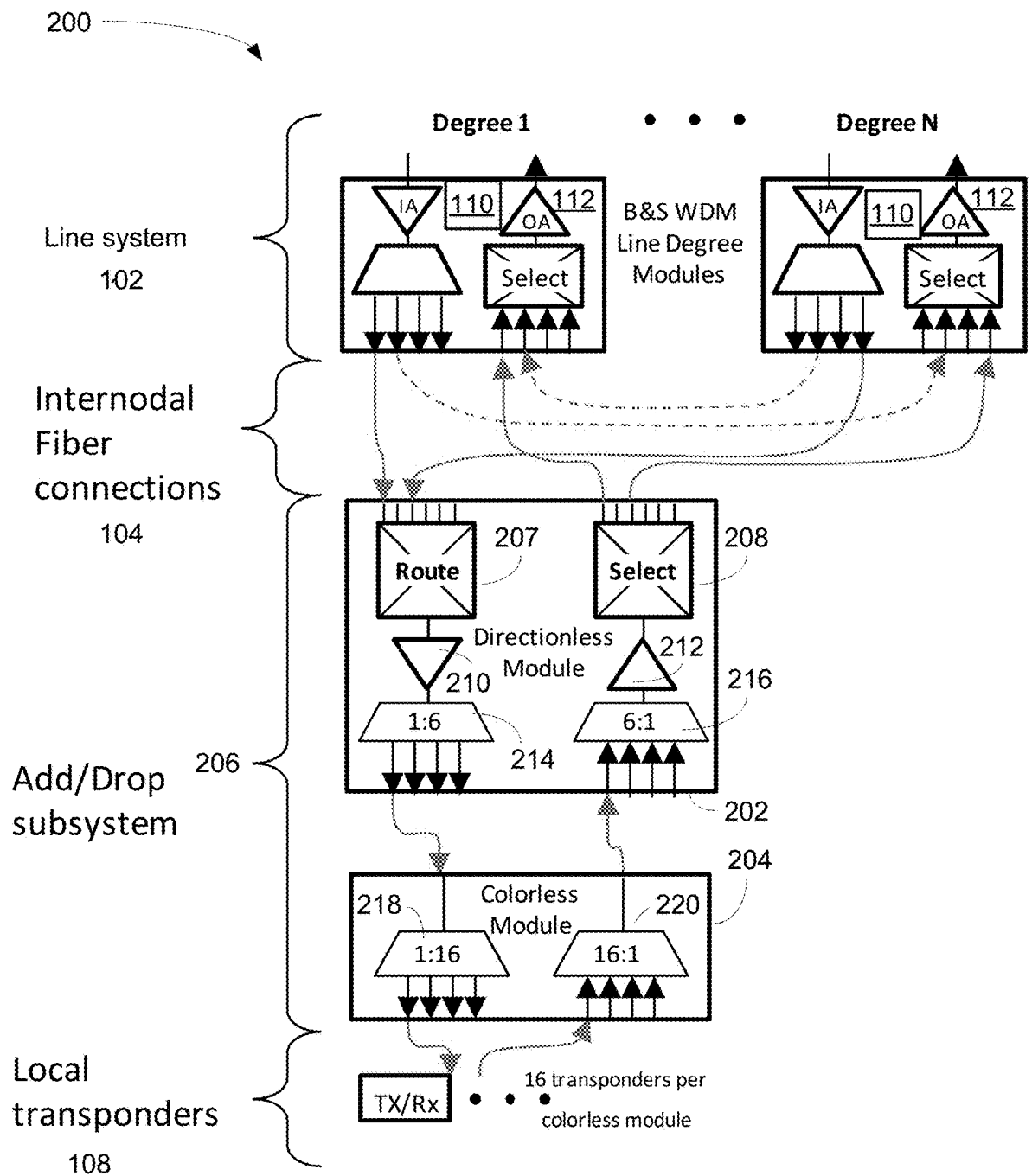
FIG. 2 is a block diagram illustrating an optical routing system containing a line system and a CD (colorless-directionless) add-drop subsystem in accordance with one embodiment of the present invention.

FIG. 2 is a block diagram illustrating a ROADM node or ORS 200 employing test signal(s) in accordance with one embodiment of the present invention. ORS 200 includes line system 102, intra-nodal fiber connections 104, add-drop subsystems 206, and local transponders 108. Line system 102 includes multiple line modules 112 wherein each line module 112, in one embodiment, includes a TCT 110 capable of discovering intra-nodal interconnections. It should be noted that the underlying concept of the exemplary embodiment(s) of the present invention would not change if one or more components (or elements) were added to or removed from FIG. 2.

Add-drop subsystem 206, in one embodiment, includes a directionless module 202 and a colorless module 204. Depending on the applications, additional add-drop subsystem 206 may be added or inserted into line system 102 in the node. Module 202, in one aspect, includes a route WSS 207, a select WSS 208, an IA 210, an OA 212, an output passive coupler 214, and an input passive coupler 216. It should be noted that output passive coupler 214 can also be referred to as an output passive splitter. Similarly, input passive coupler 216 can also be referred to as an input passive splitter.

Colorless module 204 includes an input passive coupler 218 and an output passive coupler 220. In one embodiment, input passive coupler 218 is a one to sixteen (1×16) splitter and output passive coupler 220 is a sixteen to one (16×1) coupler. Depending on the applications, the size of the passive coupler can vary, such as 1×8 or 1×64 (also can be expressed as 1:8 or 1:64) splitters The architecture of ROADM node as shown in FIG. 2 can be decomposed into four components, namely line subsystem 102, intra-nodal fiber connections 104, add-drop subsystem 206, and local transponders 108. Line system 102, in one aspect, contains the WDM line optical amplifiers and WSS for generating final optical signal before transmitting the signal. Line modules 112 can also be referred to as OADM modules. Line module 112, in one example, is able to multiplex and/or switch express traffic via optical channels between degree(s) of nodes. Line module 112 is also able to perform regional or local add and/or drop signals, such as originating optical channels and/or terminating the channel(s) at the node.

Add-drop subsystem 206 aggregates add channels from local transponders 108 and presents the aggregated channels to line module 112 for handling optical data transmission. In one example, after receiving channels from local transponders 108, subsystem 206 is responsible for routing the data traveling on the channels including selectively dropping one or more channels based on predefined routing schedules. Directionless module 202 and colorless module 204 can enable add-drop subsystem 206 to be both colorless and directionless ("CD") in routing traffic signals whereby any transponder can take any wavelength not already in use and forward the wavelength to any line degree module(s). One limitation of CD add-drop subsystems is that a single wavelength is used once in directionless module 202 in this sense, it has the potential of blocking (i.e. not allowing) wavelength reuse between transponder attached to the same directionless module. In one aspect, directionless module 202 is configured to realize a directionless switch for local add and/or drop. Colorless module 204 is capable of multiplexing several channels from local transponders 108 and generating a single optical data traffic containing multiple channels carrying multiple sets of data.

ORS 200 uses line modules 112 and CD add-drop subsystem 206 to improve efficiency and capacity of network traffic. The ROADM node shown in diagram 200 is able to support many transmission formats with the capabilities of colorless and directionless ("CD") traffic transmission.

Figure 3:
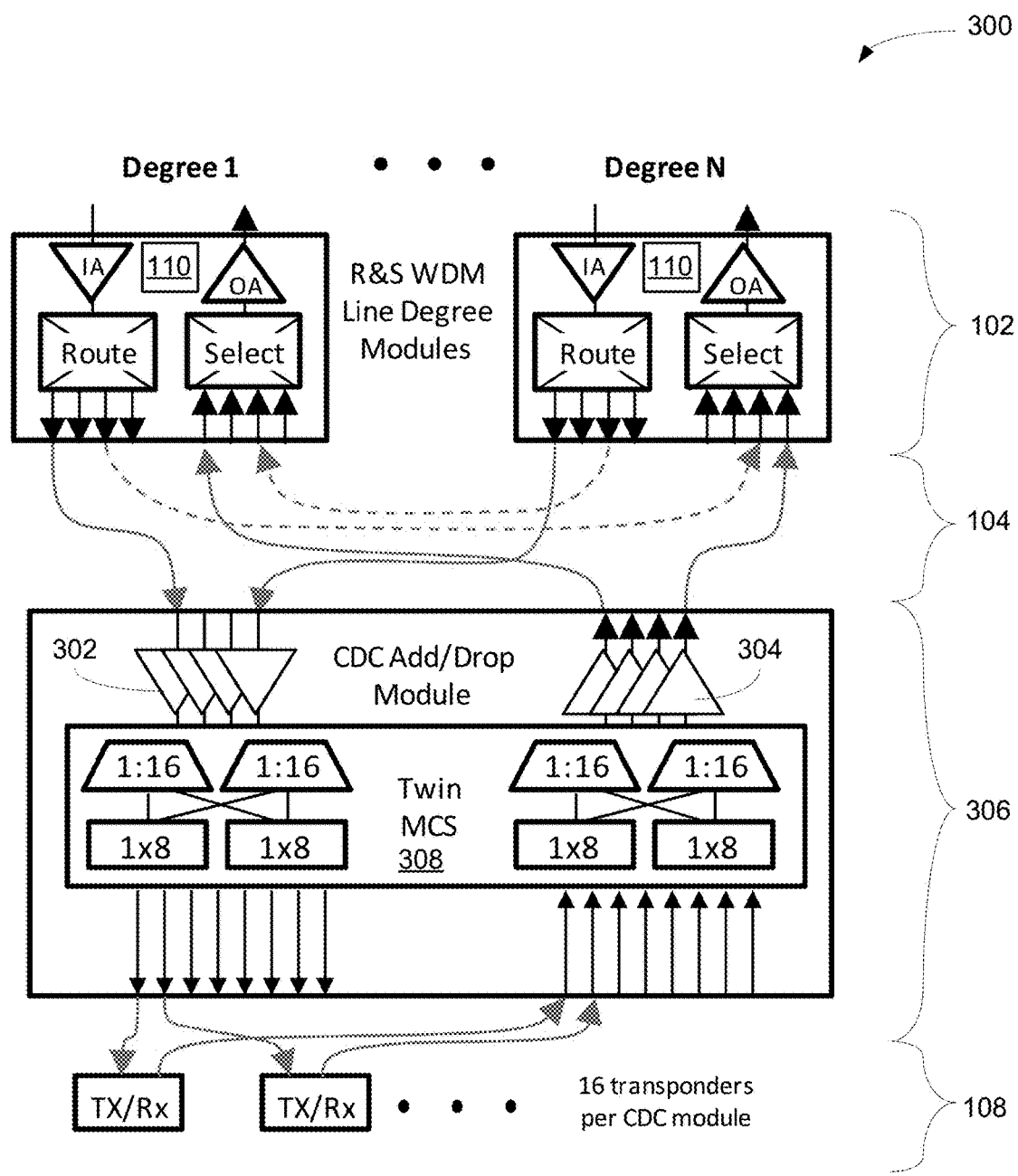
FIG. 3 is a block diagram illustrating an alternative embodiment of optical routing system using test channel(s) in accordance with one embodiment of the present invention.

FIG. 3 is a block diagram illustrating an alternative embodiment of ORS 300 capable of discovering connections using test channel(s) in accordance with one embodiment of the present invention. ORS 300 includes line system 102, intra-nodal fiber connections 104, subsystem 306, and local transponders 108 wherein subsystem 306 is a CDC add-drop module. Line system 102, in one embodiment, includes one or more TCT 110 capable of discovering intra-nodal interconnections. It should be noted that the underlying concept of the exemplary embodiment(s) of the present invention would not change if one or more components (or elements) were added to or removed from FIG. 3.

Subsystem 306, in one embodiment, includes fiber amplifier arrays 302-304 and multi-cast switch ("MCS") 308 wherein MCS 308 further includes multiple passive couplers and splitters. Depending on the applications, additional WSS or WSSs may be placed at OADM WDM input signals to route data traffic to their desired destinations. Subsystem 306 can provide better optical performance and can scale up port counts. It should be noted that it is possible to expand the number of express ports on an optical add-drop multiplexer ("OADM") by adding an "expansion OADM" to each degree of OADM.

Figure 4:
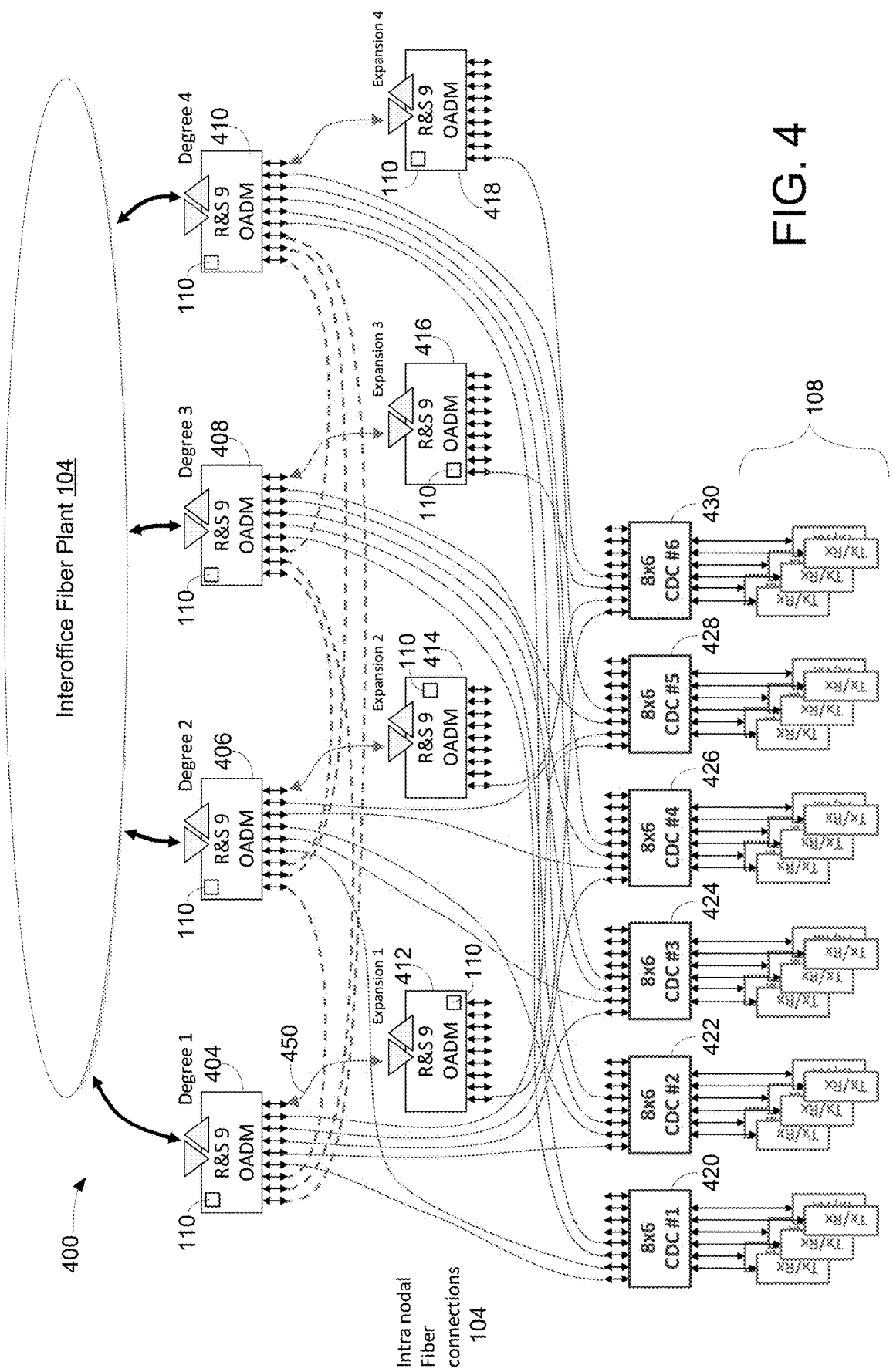
FIG. 4 is a block diagram illustrating a four (4) degree system with expansion optical add-drop multiplexers ("OADMs") in accordance with one embodiment of the present invention.

FIG. 4 is a block diagram illustrating an exemplary node with a four (4) degree routing system 400 with expansion OADMs in accordance with one embodiment of the present invention. System 400, which is similar to ORS 300 shown in FIG. 3, includes the line system, intra-nodal fiber connections 104, add-drop subsystem, and local transponders 108 wherein the line system includes four (4) OADMs 404-410 and four (4) expansion OADMs 412-418. Expansion OADMs 412-418 are used to enhance the scalability. Each OADM such as OADM 404, in one embodiment, includes a TCT 110 which is used to discover intra-nodal interconnections. It should be noted that the underlying concept of the exemplary embodiment(s) of the present invention would not change if one or more components (or elements) were added to or removed from FIG. 4.

Each OADM, in one embodiment, is 1 to 9 (1×9) route and select ("R&S") OADM wherein each of the R&S OADM uses one set of line input amplifier and line output amplifier to transmit and/or receive optical data with interoffice fiber plant 104. The OADM such as OADM 404 includes nine (9) express out ports and nine (9) express in ports for intra-nodal data transfer such as transmitting data to add-drop subsystems. OADMs 412-418, which are also 1×9 R&S OADMs, are primarily used for expansions. For instance, when OADM 404 is running out of express ports, OADM 404 can expand to OADM 412 using ports located in OADM 412 via connection 450. A cascade configuration of OADM 404 and OADM 412 can be formed. For example, to expand to OADM 412, one express out port of OADM 404 is coupled to line input amplifier of OADM 412 and one express in port of OADM 404 is coupled to line output amplifier of OADM 412. Note that an expansion of 1×17 multiplexer is created when OADM 404 and OADM 412 are linked. It should be noted that additional OADMs may be used to expand ports configuration for an R&S OADM.

The add-drop subsystem illustrated in system 400 includes multiple 8×6 CDC add-drop ("CDC") modules 420-430. Each of 8×6 CDC modules 420-430 allocates eight (8) ports for communicating with OADMs 404-418 and allocates six (6) ports for communicating with local transponders 108. It should be noted that the underlying concept of the embodiment of the present invention does not change if CDC modules have more than 8×6 ports or less than 8×6 ports.

Using expansion OADM allows additional ports to be added after initial installation of OADM(s). A function of using the expansion OADMs is to provide flexibility to manage network growth in degrees and/or local transponders. With application of CDC add-drop subsystem, any transponder can use any channel and sends signal to any port of any OADM. System 400 may allow, for example, a CDC add-drop module to route the same wavelength from multiple transponders to multiple degrees without occurrence of wavelength blocking or contention.

Expansion OADMs 412-418, which are also known as OADM cards, include line-in ports and line-out ports that are usually configured to connect to the interoffice fiber plant 104 if the OADMs are configured to handle inter-node communications. When OADMs such as OADMs 412-418 are configured as expansion OADMs, the line-in and line-out ports are used as a part of the intra-node fiber connections whereby the line-in and line-out ports are configured to transmit and/or receive test channels. It should be noted that express ports of expansion OADM will also be configured to carry test signals over a test channel(s).

Referring back to FIG. 4, managing and maintaining voluminous optical fibers and/or fiber jumpers between the ports can be complex, tedious, error-prone, and/or time consuming. Fiber connections are bi-directional which may be realized with a fiber pair. OADMs 404-418 are configured to be nine (9) port modules. It should be noted that 9-port module is an exemplary module, and it can be scaled up to 20 or more ports which could easily result in hundreds of fiber jumpers between modules.

To simplify cabling, fiber ribbon cables may be used to reduce the number of fibers. For example, some fiber ribbon cables compose 12 fibers per cable wherein each cable includes a single MPO (Multiple-Fiber Push-on/Pull-off) connector at each end of the cable. Note that the end of cable may include terminators capable of terminating fibers. Intra-nodal fiber connections 104 in FIG. 4 illustrate fiber routing that is meshed in fibers between modules. To employ MPO-to-MPO cable coupling, a fiber shuffler, not shown in FIG. 4, can be used to simplify cabling. The fiber shuffler, in one aspect, is able to shuffle or route fibers between the modules.

The fiber shuffler, in one embodiment, allows MPO connectors to directly connect to modules. The fibers from one MPO connector are internally routed by the fiber shuffler before the fibers reach to another MPO connector. Coupling MPO cables between modules and the fiber shuffler(s) greatly simplifies the intra-nodal fiber connections. It should be noted that the fiber shuffler is capable of making individual fiber connection between modules. Various embodiments of the present invention describe the intra-nodal fiber connections that optically connect between line modules, expansion modules, CD, and/or CDC modules. In one embodiment, TCT 110 is capable of providing operational aspect of installing and verifying fiber connections, as well as diagnosing fiber connections as well as failures.

Figure 5:
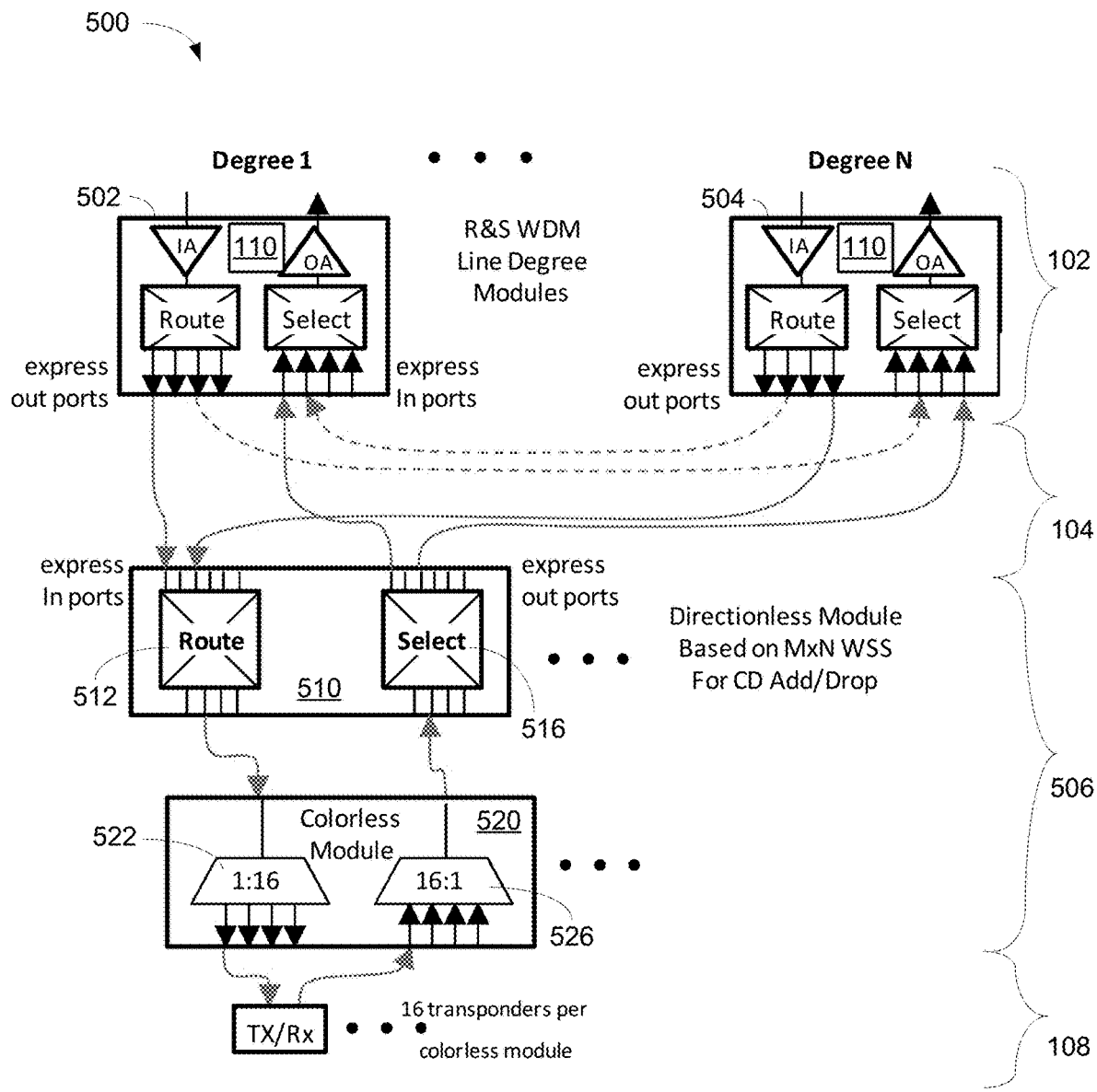
FIG. 5 is a block diagram illustrating an optical routing system capable of routing and selecting optical signals using CD add-drop modules in accordance with one embodiment of the present invention.

FIG. 5 is a block diagram illustrating ORS 500 capable of routing and selecting optical signals using CD add-drop modules in accordance with one embodiment of the present invention. ORS 500, which is similar to system 400 shown in FIG. 4, includes a line system 102, intra-nodal fiber connections 104, add-drop subsystem 506, and local transponders 108 wherein subsystem 506 further includes one or more directionless modules 510 and one or more colorless modules 520. It should be noted that the underlying concept of the exemplary embodiment(s) of the present invention would not change if one or more components (or elements) were added to or removed from FIG. 5.

Subsystem 506 is an alternative configuration of add-drop subsystem 202 shown in FIG. 2, wherein add-drop directionless module 510 is, for example, built from M×N WSS while directionless module 202 is configured with N×1 WSS, where N and M are integers. Subsystem 506 can be configured to be either CD or CDC add-drop subsystem(s). Subsystem 506 can support large nodes with the capability of scaling up as the number of nodes or size of the node grows.

Module 510 illustrates an exemplary add-drop module containing one M×N route WSS and one M×N select WSS. In an alternative embodiment, colorless module 520 and directionless module 510 are combined into a single component. Also, depending on the applications, the add-drop subsystems can be combined with the line systems or modules to form an integrated routing device. To simplify the forgoing explanation, a separate route and select line system and add-drop subsystem are used. Note that other combinations and port sizes are also envisioned by the embodiment of the present invention.

The ports that connect to the intra-nodal fibers between optical modules are labeled as either "express out" or "express in". The express out ports indicate optical channels that transmit data, optical signals, or optical wavelength out of the module. The express in ports indicate the optical channels that receive data or optical signals from other modules. In one aspect, fiber connections between the express ports are referred to as the "express mesh" because it meshes the express ports between the optical modules. Note that the express ports include both express in ports and express out ports. It should be noted that the express mesh may not include all intra-node fiber connections between the CD add-drop modules.

TCT 110, in one embodiment, is capable of providing a test channel which may be embedded in each express fiber or traffic channel(s). In WDM, multiple traffic bearing channels are wavelength multiplexed onto these intra-nodal connections. The test channel is another wavelength traveling along with the traffic bearing channels over the same fiber. The wavelength for the test channel is chosen to be different from the traffic channels thereby the interference between the test channel and traffic channel is minimized. In one embodiment, the test channel is used in the intra-nodal discovery and/or connection diagnosis. The interoffice fiber plant, in one aspect, generally does not see the test channel.

In one embodiment, each optical module in the node includes a TCT 110 wherein each TCT 110 includes a transmitter and a receiver (or transceiver) to transmit and/or receive test signals to and from the test channel(s). The transmitter, for example, includes a laser source and modulator. In general, a c-band WDM system uses laser frequencies up to 196.1 terahertz ("THz"). To keep the test channel away from the traffic channels, a test laser may have a frequency of, for example, 196.2 THz. The transmit modulator is used to modulate a unique signal emitted by the laser.

The modulation used may be non-return to zero, amplitude modulation, frequency modulation, phase modulation, or some other form of modulation. In one example, a low frequency sinusoidal amplitude modulation may be used. When an optical module is inserted into the WDM system, the optical module is assigned to a unique test channel ID or a set of IDs by a system controller. The module modulates its test channel with the assigned ID or IDs and sends the assigned ID to each of its output ports via multiplexing test channel onto traffic channel(s). Each optical module is also configured to receive test channel IDs on its express-in ports from other connected modules to determine the interconnections between the modules. In one example, a port connection map can be built and/or verified, and the map can be subsequently used for routing between modules.

The TCT or test module may be able to identify fiber connections that have been established by the operator and "self-discover" or discover the interconnections between optical modules and notify the operator if the mesh interconnect is complete, correct, and/or error free.

Figure 6A:
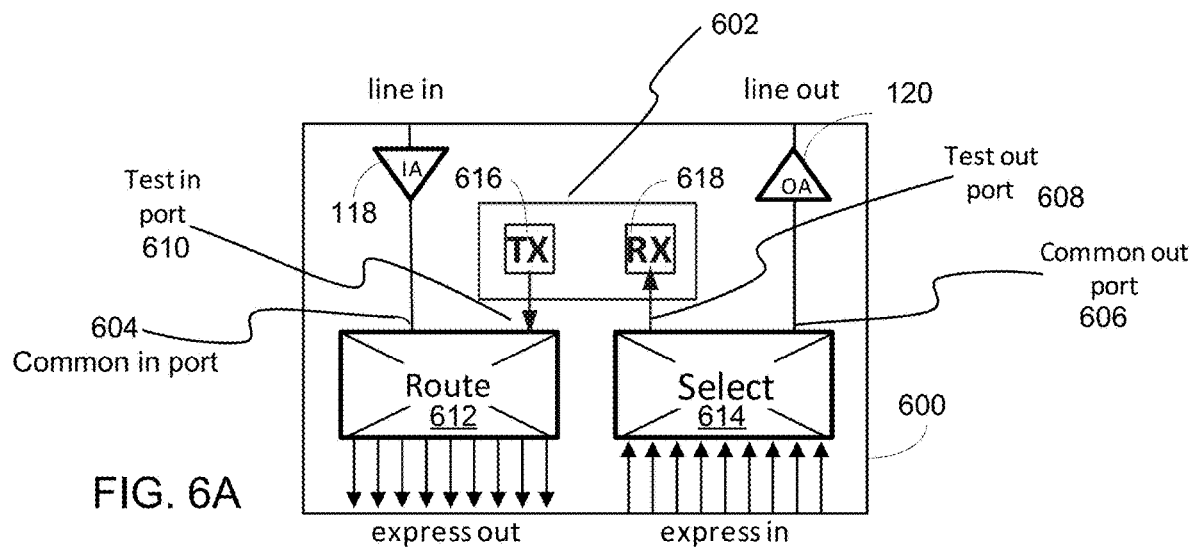
FIGS. 6A-B are block diagrams illustrating an OADM line module having a test channel transceiver ("TCT") in accordance with one embodiment of the present invention.

FIG. 6A is a block diagram illustrating an OADM line module 600 having a TCT 602 in accordance with one embodiment of the present invention. Line module 600 includes a route WSS 612, a select WSS 614, a line input amplifier 118, a line output amplifier 120, and TCT 602. Route WSS 612 is a 2×9 WSS and select WSS 614 is a 2×9 WSS. TCT 602, in one embodiment, includes a test transmitter 616 and a test receiver 618 configured to transmit or receive test signals. It should be noted that the underlying concept of the exemplary embodiment(s) of the present invention would not change if one or more components (or elements) were added to or removed from FIG. 6A.

Test transmitter 616 is connected to a test port 610 on route WSS 612 and common-in port 604 is dedicated to traffic channels. Route WSS 612, in one embodiment, switches the test channel to transmit test signal successively to each of the nine express outputs so that the test channel is time shared on each output. While the test channel is time multiplexed to the express outputs, route WSS 612 maintains traffic channels on the express output ports.

Test channel receiver or test receiver 618 is configured to connect to a test out port 608 of select WSS 614. Select WSS 614, in one embodiment, manages and successively switches the test channel to test out port 608 from one of the nine express-in ports while maintaining selected traffic channels on common-out port 606. Test receiver 618 includes a photo diode and demodulator. The output of demodulator is used to identify a test channel IDs sent from other connected modules in the node. It should be noted that WSS 614 and WSS 612 are configured to use 2×9 port WSSs with common ports and test ports.

The optical module such as line module 600 or 630 (shown in FIG. 6B) is configured to route optical signals in a network node. Route WSS 612 is coupled to express-out ports and a line-in port 118 and is configured to selectively route signals from the line-in port to one of the express-out ports. Select WSS 614 is coupled to express-in ports and a line-out port 120 and is configured to selectively transmit signals from one of the express-in ports to the line-out port. WSSs 612-614 include 2×9 express ports. It should be noted that any other combination M×N express ports are possible for WSS modules.

TCT 602 includes test transmitter 616 and test receiver 618 wherein test transmitter 616 is coupled to a test input port 610 of route WSS 612. Test receiver 618 is coupled to a test out port 608 of select WSS 614, wherein test receiver 618, in one aspect, is able to identify intra-connections in accordance with received IDs carried by test signals with a unique optical frequency. Test transmitter 616 is able to generate a test signal indicating a unique ID identifying and/or associated with the optical module such as module 600. The ID may also specify, for example, connector and/or port numbers. The test signal, which is multiplexed onto a traffic signal, is, for example, sent to a connected port located at a second optical module.

Figure 6B:
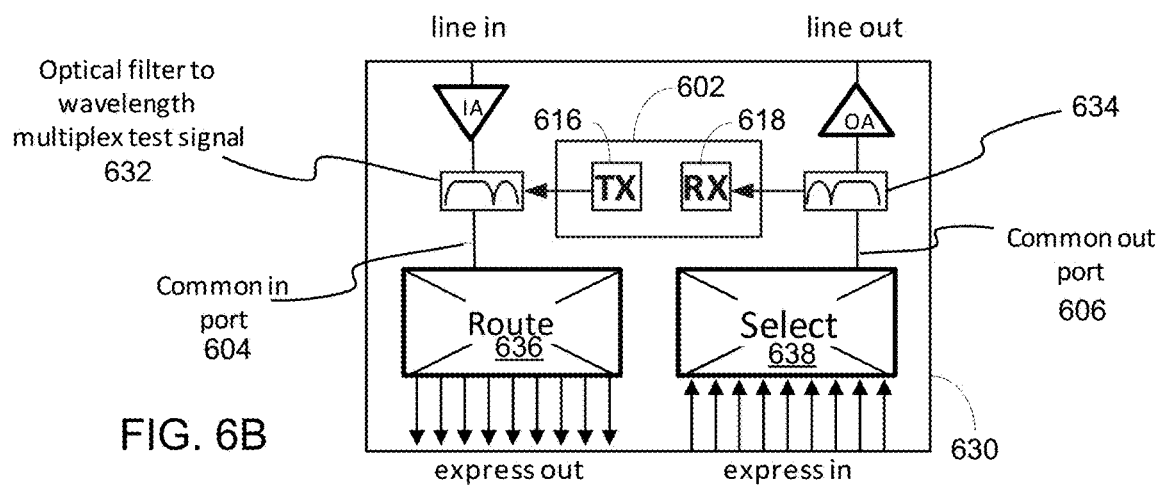

FIG. 6B is a block diagram illustrating a line module 630 using an alternative TCT coupling configuration in accordance with one embodiment of the present invention. Module 630 is similar to module 600 in FIG. 6A except that module 630 uses 1×9 WSS instead of 2×9 WSS. Line module 630 includes a route WSS 636, a select WSS 638, a line input amplifier, a line output amplifier, and TCT 602. Route WSS 636 is a 1×9 WSS and select WSS 638 is a 1×9 WSS. TCT 602, in one embodiment, includes a test transmitter 616 and a test receiver 618 configured to transmit and/or receive test signals. It should be noted that the underlying concept of the exemplary embodiment(s) of the present invention would not change if one or more components (or elements) were added to or removed from FIG. 6B.

WSS 636 or 638, in one embodiment, is configured to be an 1×9 WSS with one common port 604 or 606, wherein one or more test signals are multiplexed or combined with traffic signals. WSS 638 is able to transmit combined or multiplexed signals to receiver 618 via common port 606. Similarly, WSS 636 is able to receive multiplexed signals from transmitter 616 and line-in port via common port 604. To multiplex test signal with traffic signal, an optical filter 632 is used to facilitate multiplexing test wavelength (or signal) with the traffic signal(s). To de-multiplex or retrieve test signals from the multiplexed data stream, optical filter 634 is used to isolate or retrieve the test signal(s) from the traffic signals. It should be noted that traffic signal can be defined optical data stream or signals that transfer data from a source(s) to a destination(s).

During operation, test signal transmitter 616, for example, generates a test channel indicating ID of module 630. The test signal may also indicate which express out port is being used to transmit the signal. The test signal is subsequently wavelength multiplexed with the traffic channels onto the single common port 604 of route WSS 636 via optical filter 632. In the reverse direction, test signal receiver 618 receives a test signal via wavelength de-multiplexing through optical filter 634 from common output port 606 of WSS 638 while the traffic channels continue traveling to their destination via the line-out amplifier. Multiplexing a test channel onto a traffic channel may also reduce the complexity of WSS with minimal performance degradation due to photon loss. Photon loss can be defined as light loss, optical energy dissipation, light degradation, and the like. Note that multiplexing multiple channels (traffic plus test) traveling through the same port and fiber can result in photon loss. It should be noted that other methods such as power combiners/splitters are possible to combine and/or separate test signals to/from traffic signals at the common input/output ports such as ports 604 or 606.

Figure 7:
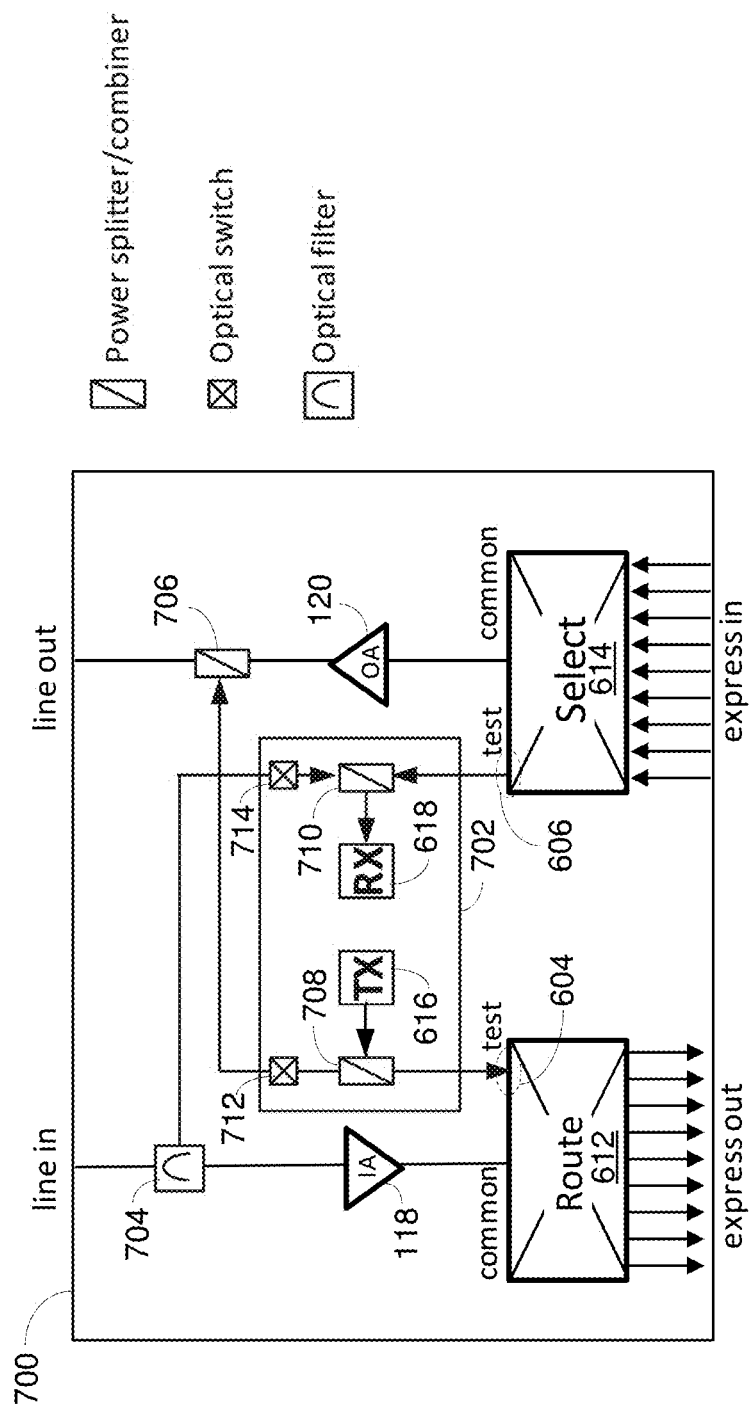
FIG. 7 is a block diagram illustrating a line module having a TCT capable of providing test channels to an expansion OADM line module in accordance with one embodiment of the present invention.

FIG. 7 is a block diagram illustrating a line module 700 having a TCT capable of providing test signals to an expansion OADM line module in accordance with one embodiment of the present invention. Module 700, which is similar to module 600 shown in FIG. 6A, except that module 700 includes a slightly different TCT 702, an optical filter 704, and a power combiner 706. TCT 702, in one embodiment, includes a single test channel transceiver which includes a transmitter 616 and a receiver 618. Transmitter 616, in one embodiment, is coupled to test port 604 via power combiner 708. Transmitter 616 is also coupled to line-out port via power combiners 706-708 and optical switch 712. Receiver 618, in one example, is able to receive test signal(s) from test port 606 via power splitter 710. Receiver 618 is able to receive test signal(s) from line-in port via optical filter 704, optical switch 714, and power splitter 710.

When an OADM or line module 700 is configured as a line module, two optical switches 712-714 are switched off to prevent test channel(s) from traveling outside to the fiber plant. However, when module 700 is configured to be an expansion OADM, optical switches 712-714 are enabled whereby the test channel signals can be shared on line-in port, line-out port, and express (express in and express out) ports. Optical switches 712-714, in one example, may be controlled by expansion configuration during provisioning.

During operation, upon generating a test signal by transmitter 616, the test signal or test wavelength is power-combined onto the line-out fiber. The test channel is wavelength de-multiplexed from the line-in signal via an optical filter 704. It should be noted that other combinations of optical filters, splitters, and combiners may be used to perform similar or same optical functions. Also, switches 712-714 may be replaced with other components such as EVOA (electrically variable optical attenuator) to perform the same or similar functions.

Figure 8A:
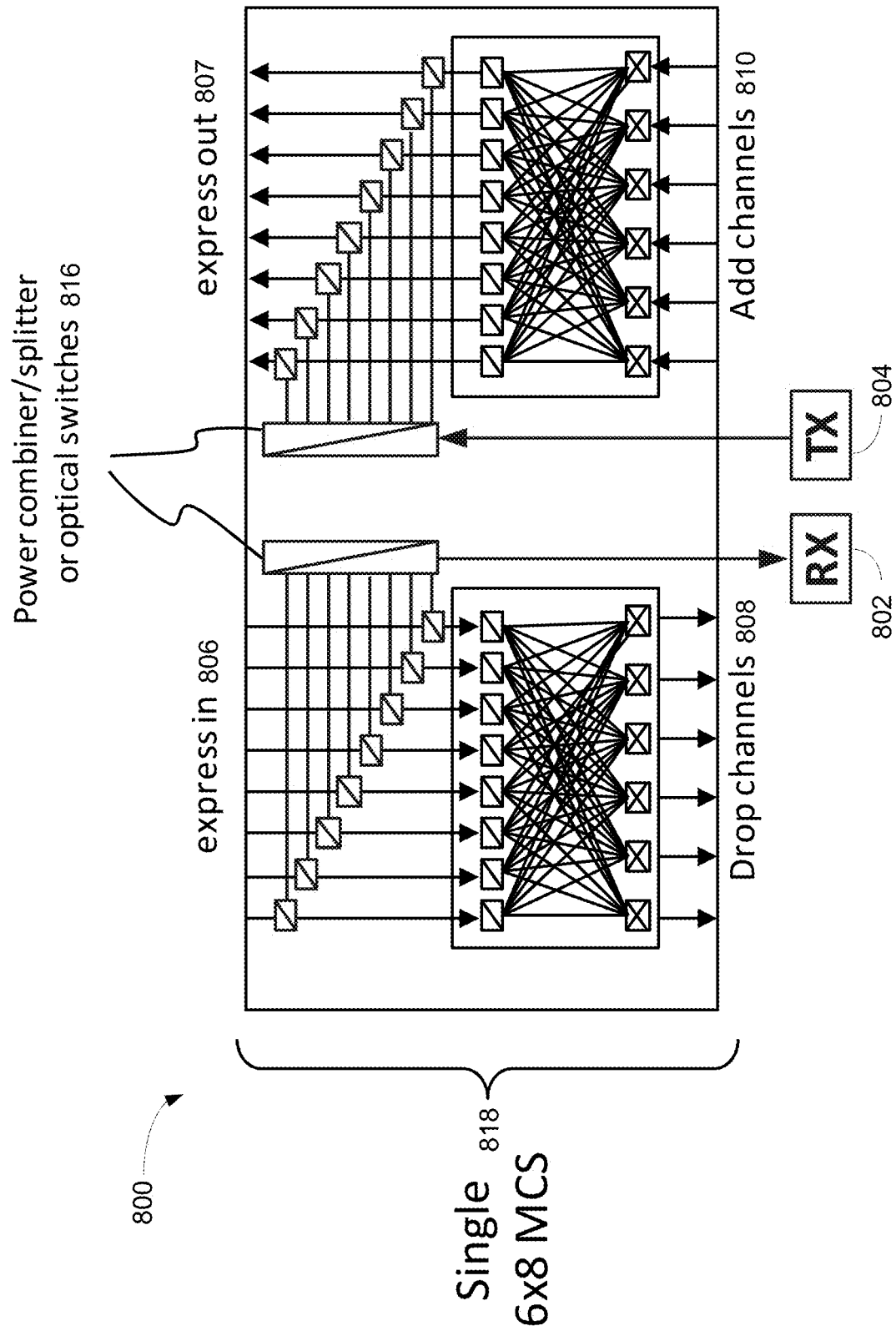
FIGS. 8A-C illustrate block diagrams showing add-drop modules using TCTs in accordance with one embodiment of the present invention.

FIG. 8A illustrates a block diagram 800 showing add-drop module using TCT in accordance with one embodiment of the present invention. Diagram 800 includes a 6×8 (six add-drop channels 808-810 and eight express in and out ports 806-807) MCS 818, a test signal receiver 802, and a test signal transmitter 804. In one aspect, 6×8 MCS 818, which is a CDC module, is coupled to transceiver 802-804 using power combiner/splitter 816. Note that one test channel solution for CDC module is illustrated. In one embodiment, the single TX such as transmitter 804 and RX such as receiver 802 are split (or switched) and passively multiplexed to/from each express port. For example, transmitter 804 sends a test signal with a unique frequency to one of eight express out ports 807 at a given time. A round-robin scheme can be implemented to broadcast module ID via a test signal to other connected modules. For example, transmitter 804 consecutively transmits a test signal to one of ports 807 at a time according to a round-robin sequence.

Figure 8B:
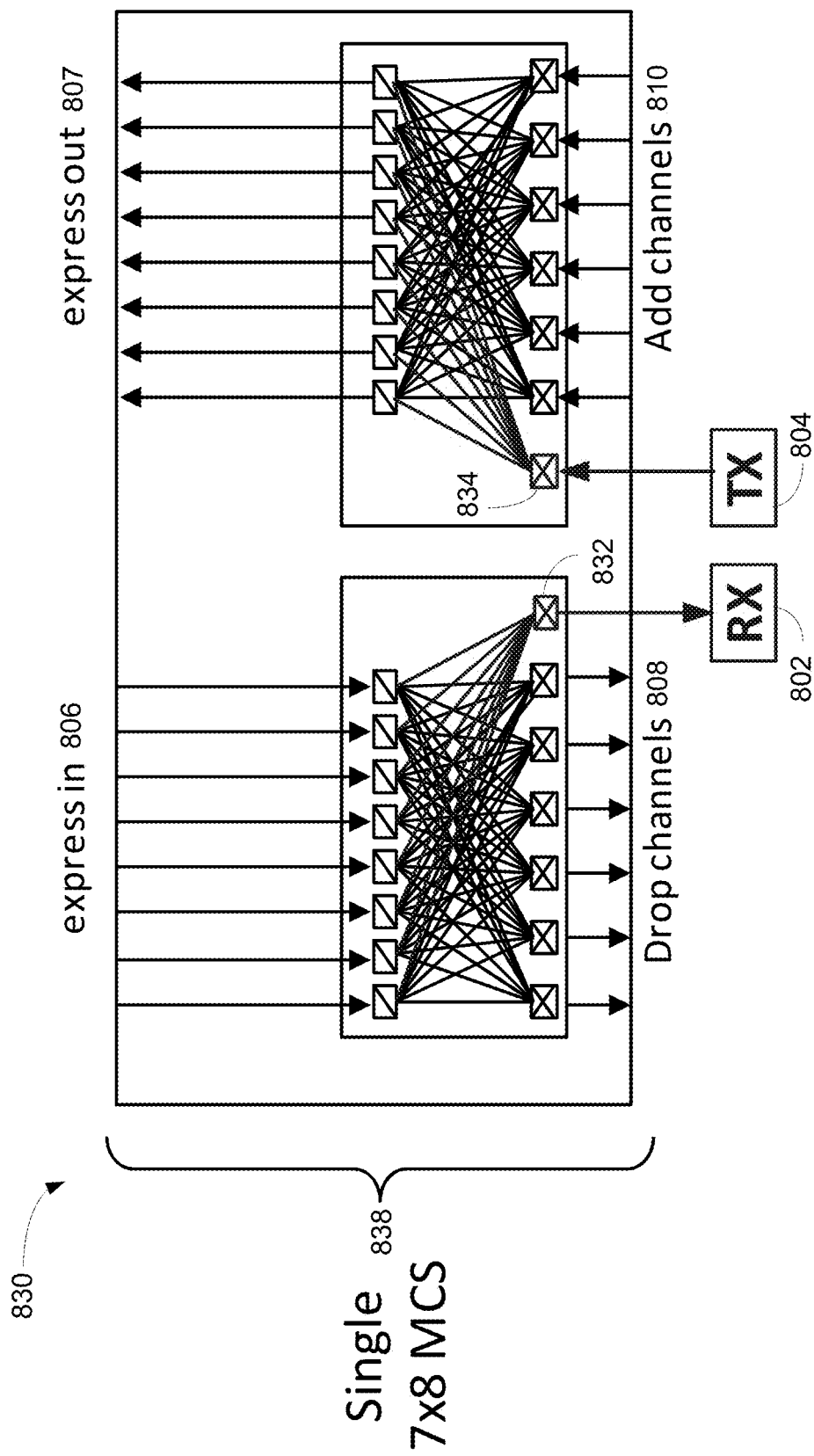

FIG. 8B illustrates a block diagram 830 showing an alternative embodiment of add-drop module using TCT in accordance with one embodiment of the present invention. Diagram 830 illustrates an alternative approach as illustration in diagram 800 shown in FIG. 8A. Diagram 830 includes a 7×8 (seven add-drop channels 808-810 and eight express in and out ports 806-807) MCS 838, a test signal receiver 802, and a test signal transmitter 804. In one aspect, 7×8 MCS 838, which is a CDC module, is coupled to transceiver 802-804 using additional or extra add-drop ports 832-834. A round-robin scheme of sending and receiving test signals can be implemented to identify or verify intra-nodal connections. Note that using a round-robin scheme minimizes performance degradation due to photon loss. Photon loss can be defined as light loss, optical energy dissipation, light degradation, and the like.

Figure 8C:
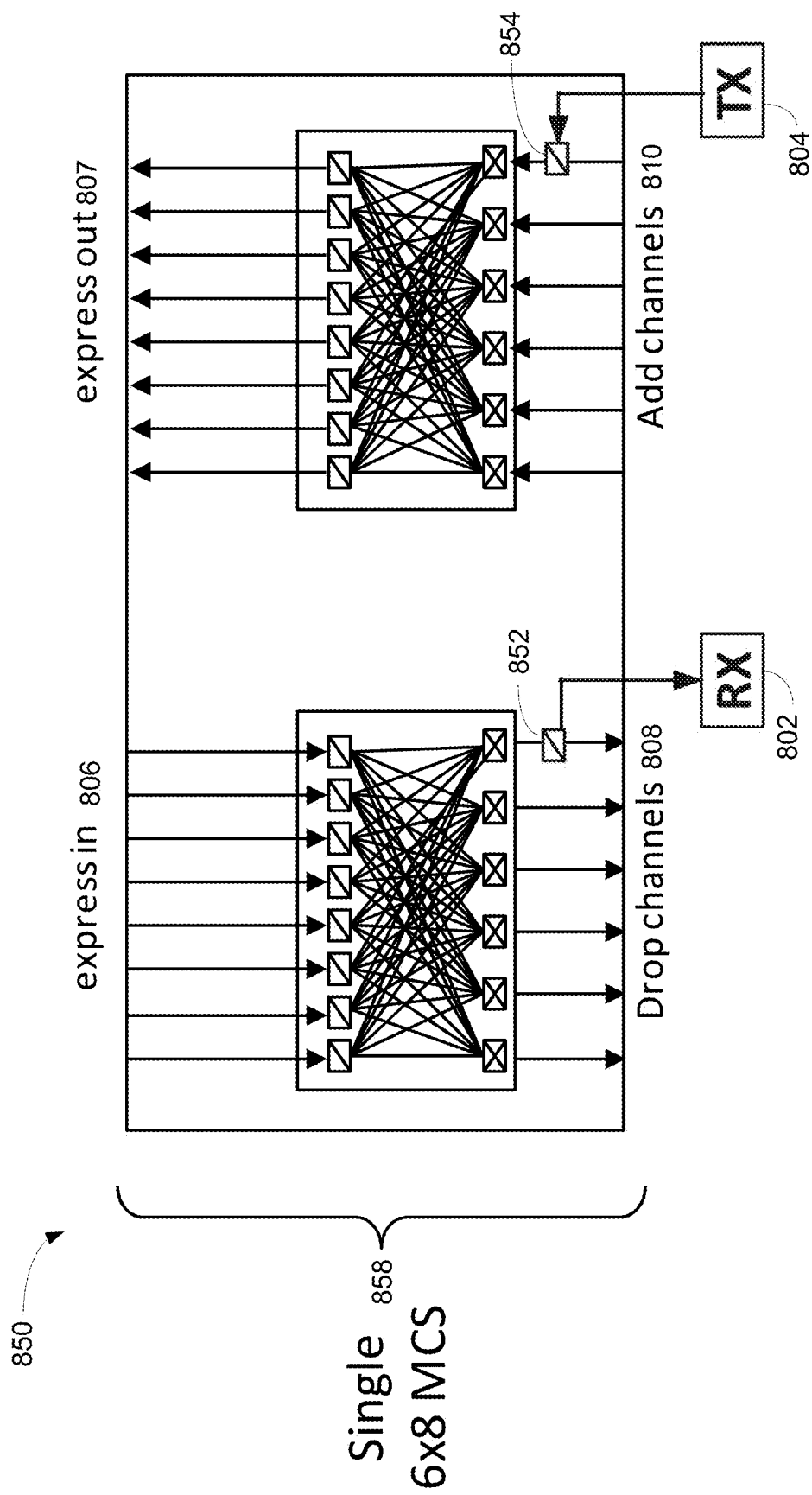

FIG. 8C illustrates a block diagram 850 showing another alternative embodiment of add-drop module using TCT in accordance with one embodiment of the present invention. Diagram 850 illustrates an alternative approach as illustration in diagram 800 shown in FIG. 8A. Diagram 850 includes a 6×8 (six add-drop channels 808-810 and eight express in and out ports 806-807) MCS 858, test signal receiver 802, and test signal transmitter 804. In one aspect, 6×8 MCS 858, which is a CDC module, is coupled to transceiver 802-804 using shared ports 852-854. A round-robin scheme for transmitting and receiving test signals can be implemented.

The TCT in the add-drop module may be used, for example, to check connectivity during module installation and verify connectivity associated with various transponders.

Figure 9:
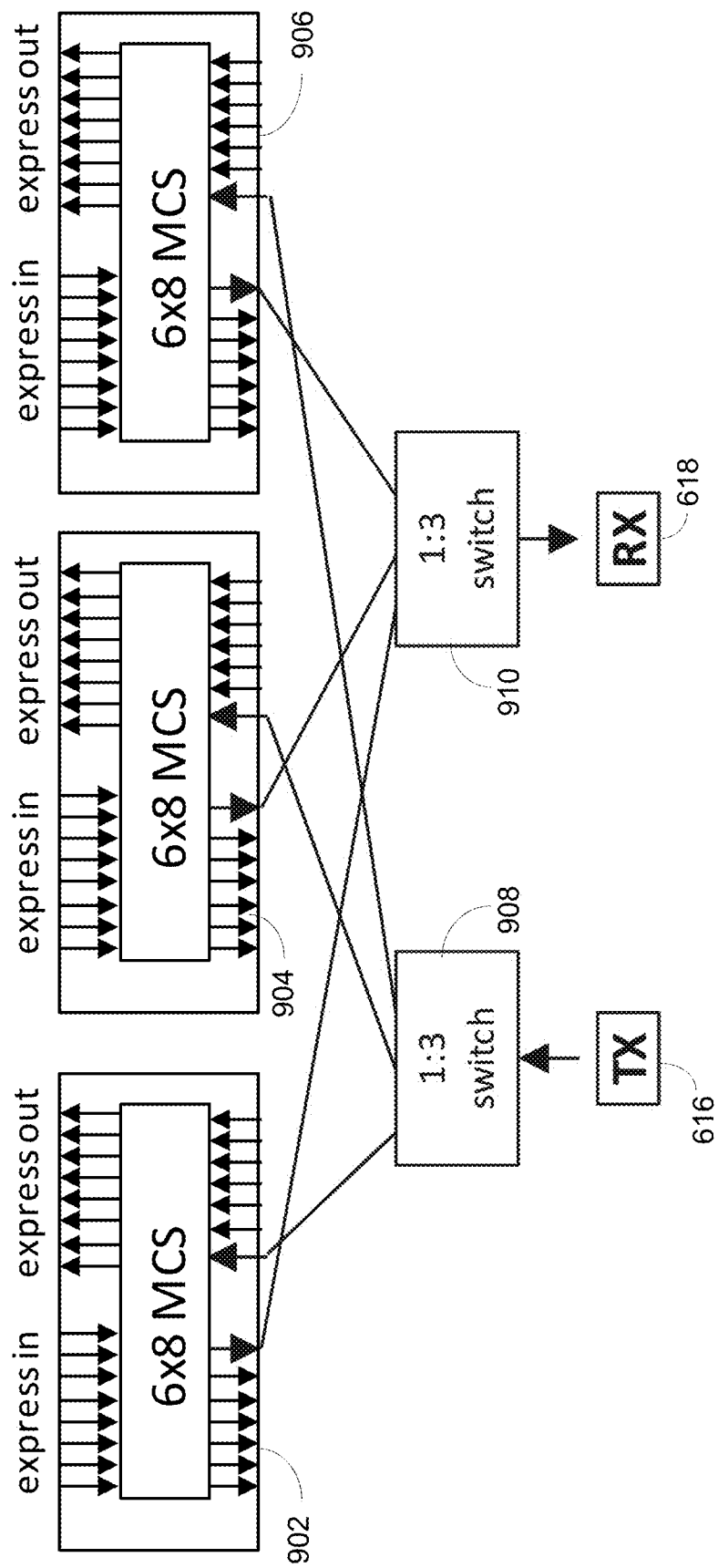
FIG. 9 is a block diagram illustrating a set of three LPC CDC modules in accordance with one embodiment of the present invention.

FIG. 9 is a block diagram 900 illustrating a set of three power & communications ("PC") CDC modules using test channels in accordance with one embodiment of the present invention. Diagram 900 includes three 6×8 CDC subsystems 902-906, two external switches 908-910, and transceiver 616-618. In one aspect, switches 908-910 are 1×3 switches. When an add-drop subsystem expands to three separate 6×8 CDC subsystems 902-906, external switches 908-910 can be used to multiplex test channel(s) whereby a shared approach of test channel between multiple CDC sub-modules can be implemented.

Figure 10:
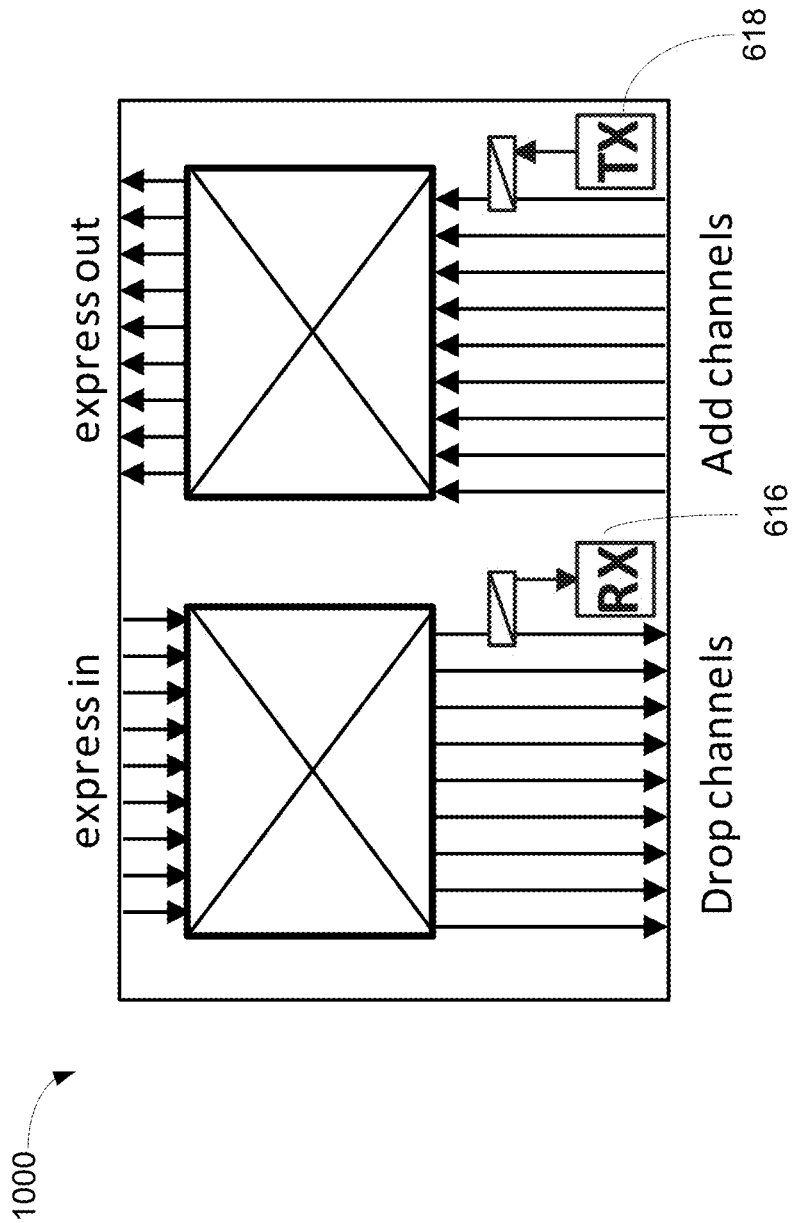
FIG. 10 is a block diagram illustrating an add-drop module using a directionless switch and TCT in accordance with one embodiment of the present invention.

FIG. 10 is a block diagram 1000 illustrating an add-drop module using a directionless switch and TCT in accordance with one embodiment of the present invention. Diagram 1000, which is similar to diagram 800 shown in FIG. 8C, shows an alternative embodiment of an add-drop subsystem having a TCT operation. The add-drop subsystem includes an M×N based directionless switch and a transceiver having TX 616 and RX 618. In one embodiment, TX 616 and RX 618 are merged and/or coupled to one set of add-drop port channel. In one aspect, the M×N WSS is used to time multiplex the single test transceiver over all express ports. Alternatively, one of the M add/drop ports on the M×N WSS can be dedicated to the TCT.

Figure 11:
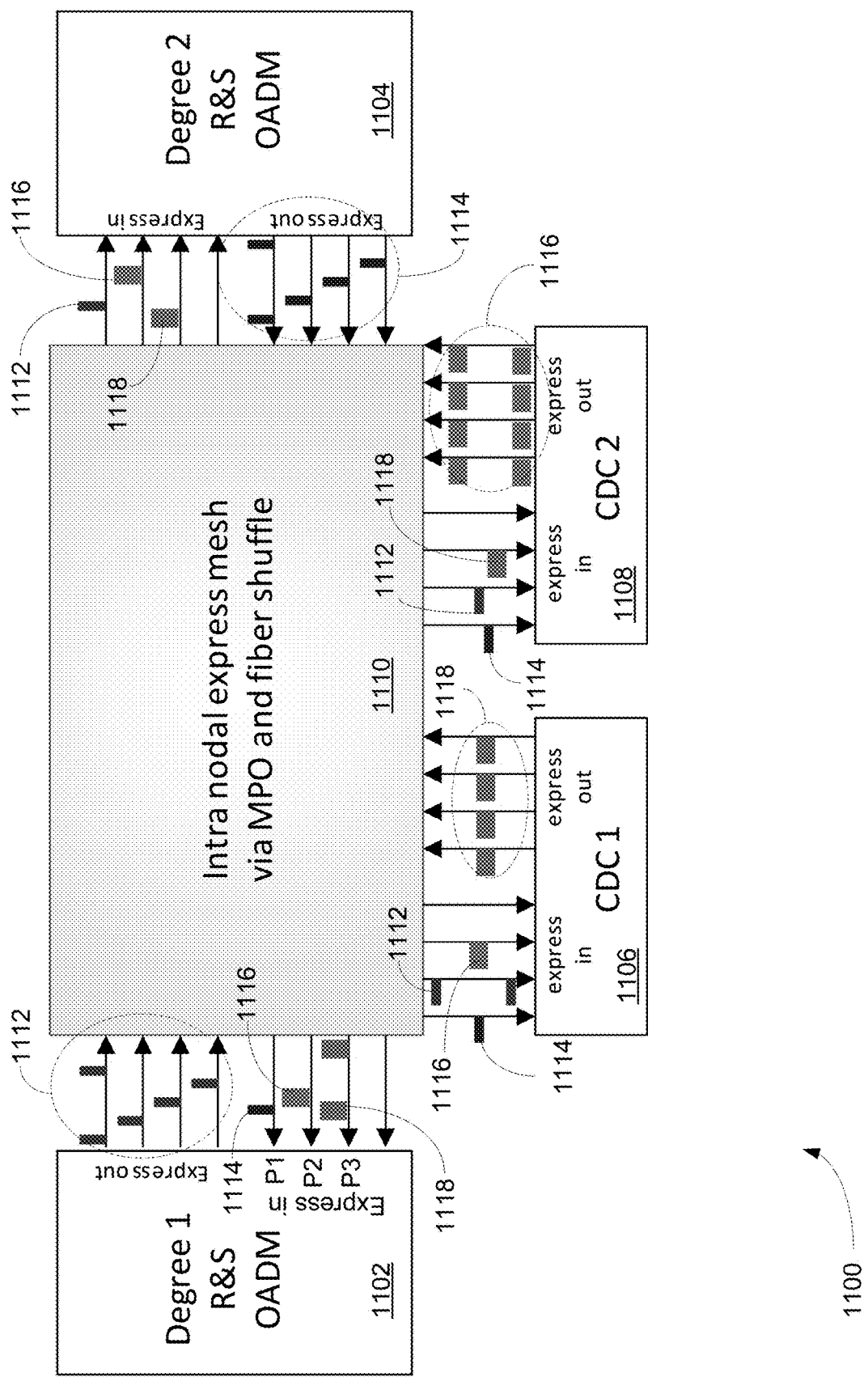
FIG. 11 is a block diagram illustrating a two-degree line system with two CDC modules in accordance with one embodiment of the present invention.

FIG. 11 is a block diagram 1100 illustrating a two-degree line module (or system) with two CDC modules in accordance with one embodiment of the present invention. Diagram 1100, in one aspect, depicts a two-degree system with two OADMs configured as WDM line modules 1102-1104 and two CDC modules 1106-1108. To simplify forgoing description, the test signals are represented as colored bars with numerical designations at the input and output ports. The colors or numerals are used to indicate unique test channel IDs assigned to the optical modules 1102-1108, such as red 1112 to degree 1 OADM 1102, blue 1114 to degree 2 OADM 1104, brown 1118 to CDC1 1106, and green 1116 to CDC2 1108. Note that color is not intended to represent laser frequency.

Diagram 1100 illustrates intra-nodal express mesh 1110 used to connect or link between OADMs 1102-1104 and CDCs 1106-1108. In one aspect, MPO and/or fiber shuffle (or shuffler) is used to cable all connections between optical modules 1102-1108. The test channels, in one aspect, are assigned to the same WDM channel frequency e.g. 196.2 THz. The color bars or numerals 1112-1118 are used to denote the test channel ID e.g. low frequency sinusoid modulated on the 196.2 THz laser. It should be noted that various test IDs to be transmitted out of the module are the same on all express-out ports. Each module has a unique test ID assigned by a network controller. To aid in self discovery of optical interconnection, test IDs may be chosen to also indicate MPO port and/or express out port.

The arrows on the express fibers indicate the directions of test signals travel as well as the direction of time. In one embodiment, the colored bars 1112-1118 on express connections are time multiplexed between the express-out ports and arrive at various times on the express-in ports. The receiver, in one example, captures the burst of the test signal(s) that occurs in a window of time. Additionally, the receiver may see multiple test signals arriving whereby it detects multiple IDs indicating the connected optical modules.

Since multiple test signals can be present at the receiver at almost the same time frame(s), the test signals may be chosen to be orthogonal to each other. Note that the same carrier frequency may be used, for example, on all test channels. Alternatively, different test signals or channels may be implemented with different carrier frequencies depending on the application. To distinguish IDs, different amplitude modulated sinusoidal frequencies can be used. For example, an N point Fast Fourier Transform (FFT) can be performed at the receiver and the channel IDs can be chosen from the N orthogonal frequencies of the FFT. To reduce false detection, dual tone multiple frequencies, in one aspect, can be utilized where each channel ID is a combination of multiple tones.

Once the interconnections between connected optical modules and/or cards are discovered and/or verified using the test channel(s), traffic channels can be accurately routed in both degree to degree switching and local add-drop processing. TCT and/or test channel implementation can also facilitate diagnosing and/or discovering fiber or intra-nodal connections. In one embodiment, TCT is able to identify cabling errors in accordance with information or knowledge discovered via test channels and the stored knowledge of optical cards in the system. For example, if an assigned test channel ID does not show up, it is likely that the optical card or module has not been fibered correctly. If a test channel ID shows up on every other module except one, then it is likely that one particular fiber is broken. If a test channel shows up but with much lower optical power than expected, an excessive loss alarm can be raised. In either case, the system can detect fiber cabling problems and may notify maintenance personnel.

In operation, TCT of OADM 1102 generates red bar 1112 as an ID identifying OADM 1102, and subsequently forwards red bar 1112 to CDC1, CDC2, and OADM 1104 via intra-nodal express mesh 1110. At the same time, the receiver of TCT is able to receive a first test signal carrying blue bar 1114 from the express in port P1, a second test signal carrying green bar 1116 from the express in port P2, and a third test signal carrying brown bar 1118 from the express in port P3. It should be noted that the first, second, and third test signals may use the same frequency such as 196.2 THz and they may or may not arrive at the P1, P2, P3 at the same time. In one aspect, the first, second and third test signals arrive consecutively in a sequence. Based on blue bar 1114, green bar 1116, and brown bar 1118, TCT of OADM 1102 is able to determine that it is connected to OADM 1104, CDC1 1106, and CDC2 1108.

It should be noted that the test channel concept can be extended to outside of the express mesh. For example, test channels can be used to identify fiber connection errors between transponders and CDC modules. The overall system performance can be negatively affected if the connection between the CDC modules and transponders are incorrectly fibered.

Figure 12:
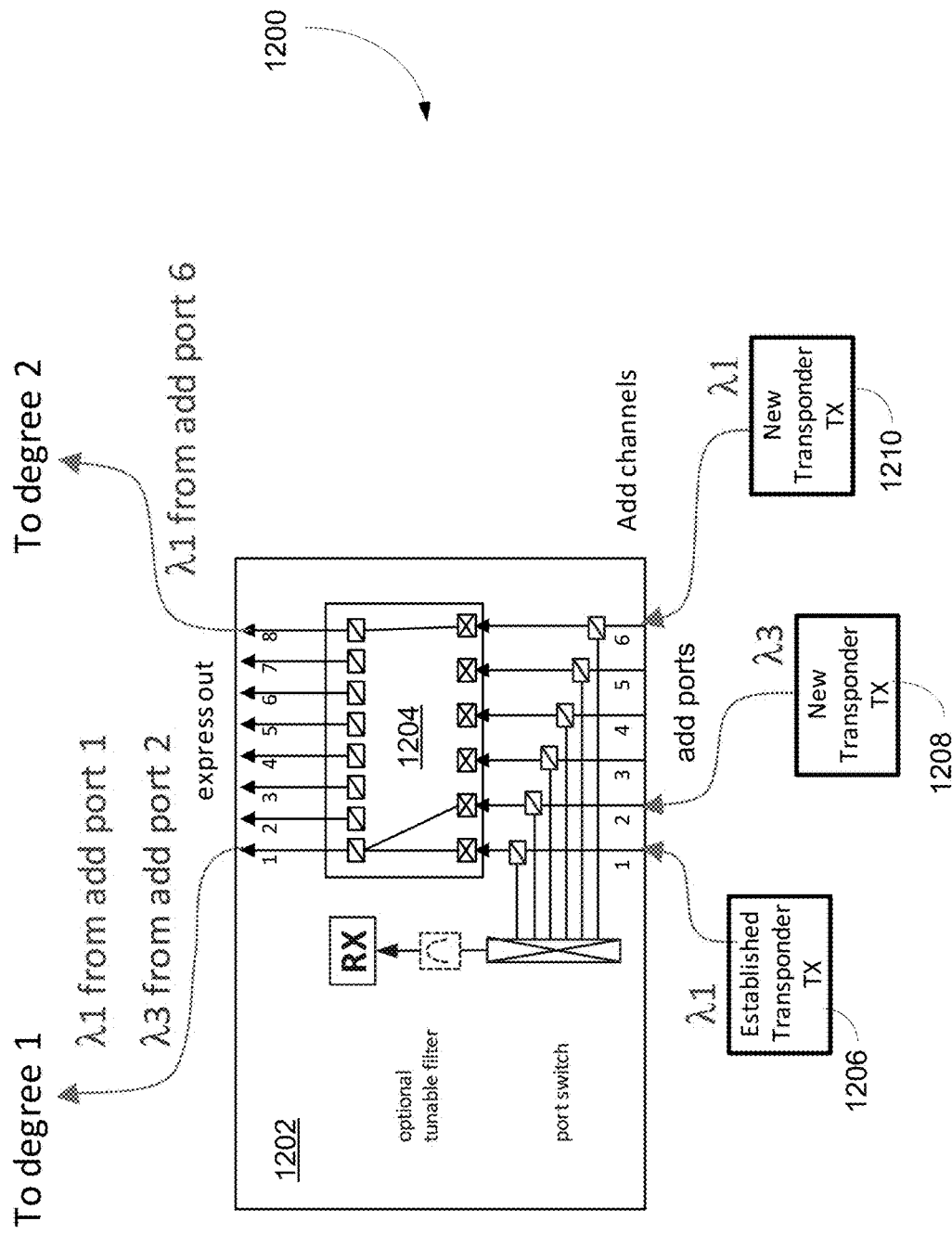
FIGS. 12-13 are block diagrams illustrating a CDC module having a test channel receiver in accordance with one embodiment of the present invention.

FIG. 12 is a block diagram 1200 illustrating a CDC module 1202 having a test channel receiver RX in accordance with one embodiment of the present invention. Diagram 1200 includes a 6×8 (six add ports and eight express out ports) CDC module 1202 and three established transponders 1206-1210. While express out port 1 feeds to degree 1 and express out port 8 feeds to degree 2, transponder 1206 is coupled to add port 1 and transponder 1208 is coupled to add port 2. In addition, transponder 1210 is coupled to add port 6. In one embodiment, RX is coupled to every express in ports via a tunable filter and a port switch.

In operation, transponder 1206 establishes a channel transmitting wavelength λ1 to add port 1 of MCS 1204. MCS switch 1204 switches on, connects, or routes add port 1 to express-out port 1 which in turn is fibered to degree 1 for line transmission. When two new transponders are fibered into CDC module 1202, add port 2 and add port 6 with wavelengths set to channel 3 (λ3) and channel 1 (λ1) respectively. Add port 2 of MCS 1204 is set to express output port 1 so that channel 3 (λ3) is wavelength multiplex with channel 1 (λ1) for transmission out to degree 1. Add port 6 of MCS switch 1204 is set to express port 8 for routing to degree 2 for line transmission. CDC module 1202 allows two different channels to use the same wavelength 1 or λ1 because it is a contentionless configuration.

If, however, two new transponders 1208-1210 are fibered incorrectly, wavelength 1 (λ1) from transponder 1210 enters add port 2 which is connected to express-out port 1. Since the express-out port 1 already has a wavelength 1 (λ1) assigned to the established transponder 1206, signals or wavelength on transponder 1210 will interfere with the wavelength from established transponder 1206 whereby channel outage can occur.

To eliminate connection errors between add-drop port of a CDC module and transponders, the transmitting laser is turned at newly installed transponder(s) to the test channel frequency (e.g. 196.2 THz). The laser is modulated to, for example, a low speed sinusoid. CDC module 1202, in one embodiment, is modified to tap off some of the power from each of the add ports. Inputs of 6-way port switch are connected to the test channel receiver RX.

In an alternative embodiment, a passive adder may be used instead of the optical switch. Sharing of the test channel receiver between the transponder ports and express-in ports is also possible. For example, the MCS switches should be set to opaque (non-transmission) during the test tone phase of connection identification to keep the transponder test channel from making their way out to the express-out port. Note that the CDC test channel is WDM multiplexed. The test channel solution or TCT requires transponders with test channel capabilities and transponders IDs.

An optional tunable filter is configured to couple to RX. The tunable filter is set to the expected channel wavelength whereby the test signals can be separated and received. The port switch is either set to the expected add port or cycled among the non-established ports looking for the new transponder.

Figure 13:
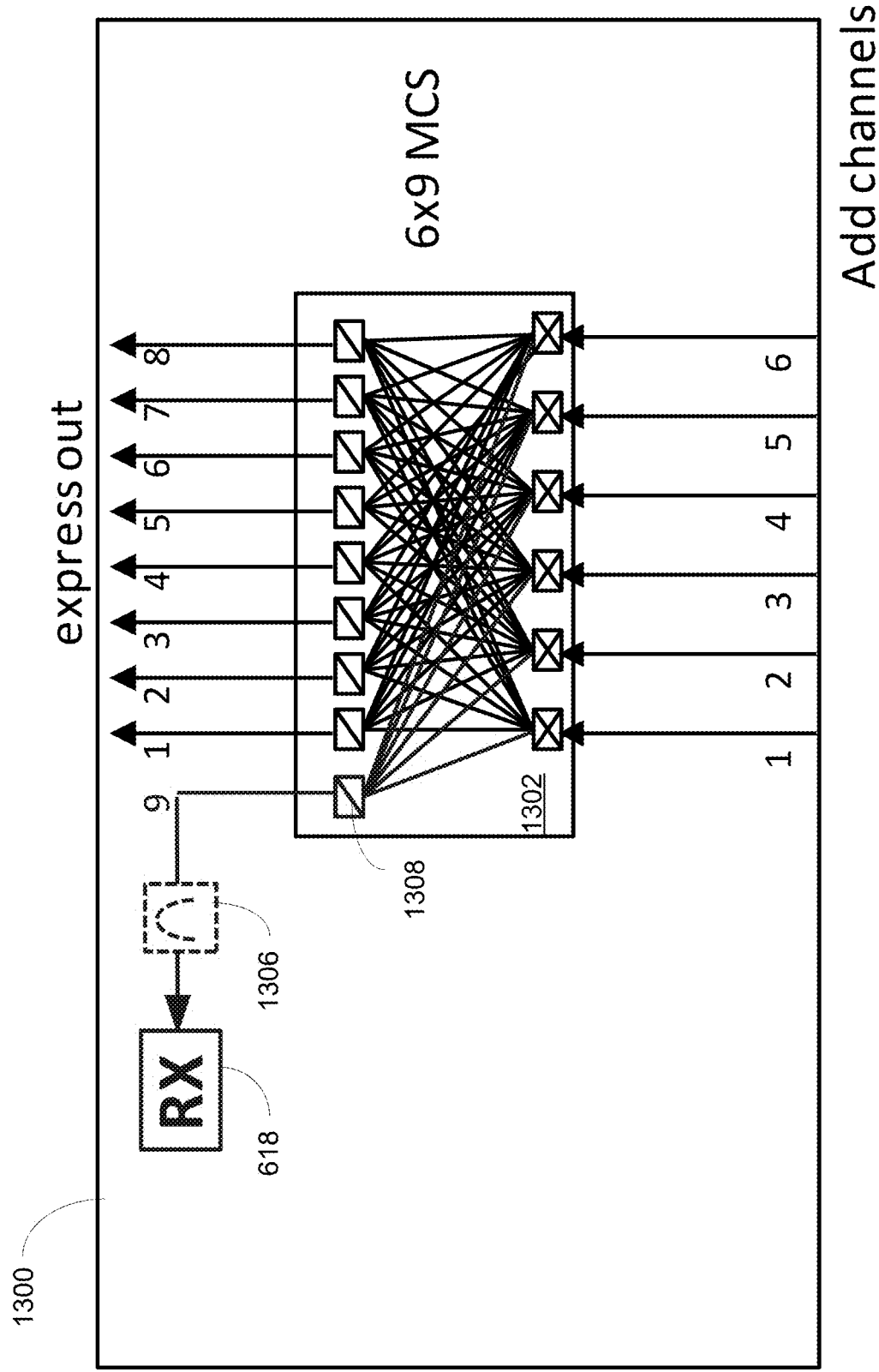

FIG. 13 is a block diagram illustrating an alternative example of CDC module 1300 having a test channel receiver 618 in accordance with one embodiment of the present invention. Module 1300 illustrates an alternative embodiment of using a 9th port 1308 from each of the six MCS switches followed by a 6-way optical combiner as shown. In one example, a 6×9 MCS 1308 designates a port such as $9^{th}$ "express-out" port 1308 for the add test channel.

Figure 14:
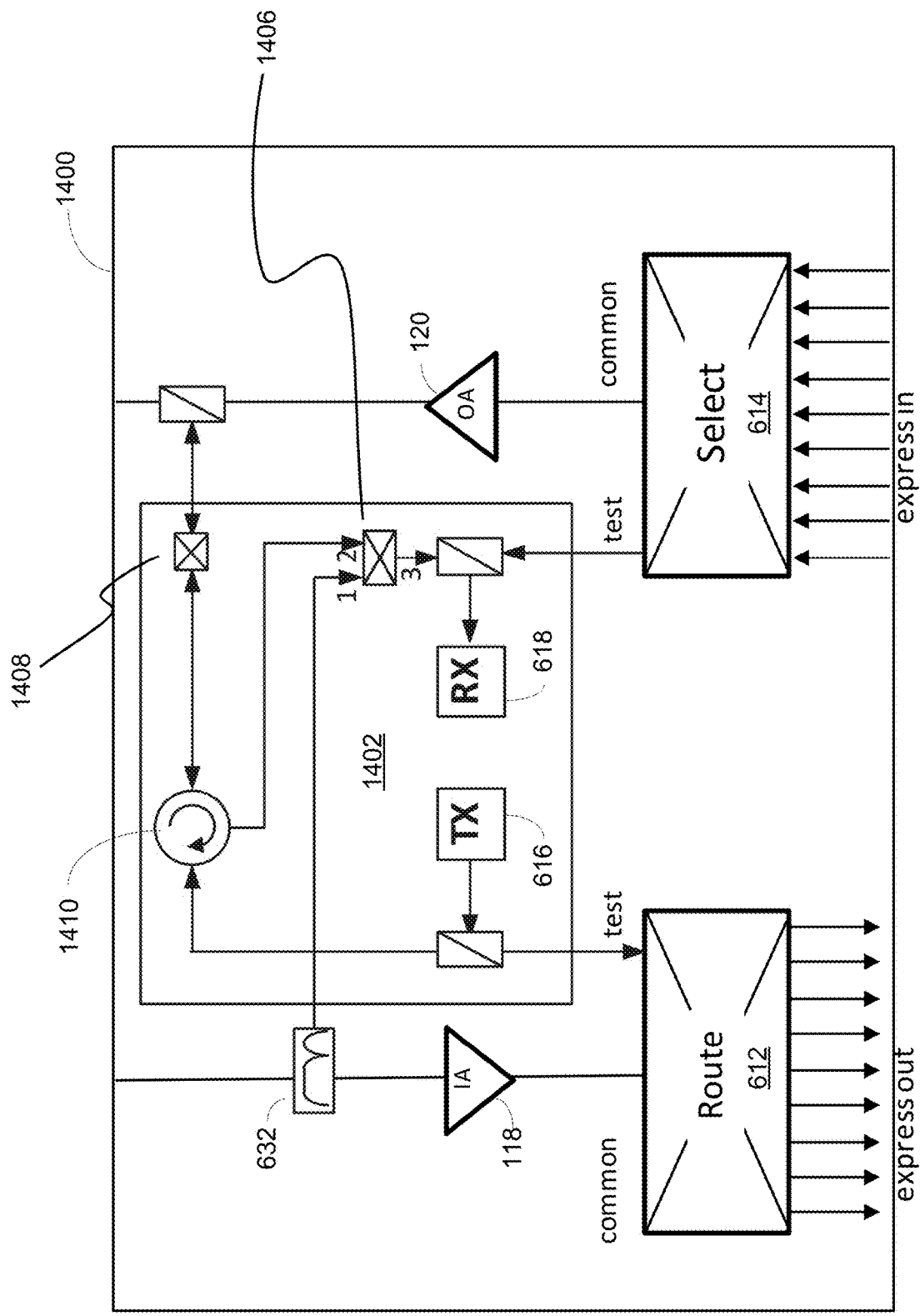
FIG. 14 is a block diagram illustrating a line module capable of performing an OTDR measurement using a TCT in accordance with one embodiment of the present invention.

FIG. 14 is a block diagram illustrating a line module 1400 capable of performing an OTDR measurement using a TCT in accordance with one embodiment of the present invention. Module 1400, which is similar to module 600 shown in FIG. 6A or module 630 shown in FIG. 6B, includes route WSS 612, select WSS 614, line input amplifier 118, line output amplifier 120, and TCT 1402. TCT 1402 is configured to perform an optical time domain reflectometry ("OTDR") function capable of estimating broken location of a fiber. It should be noted that the underlying concept of the exemplary embodiment(s) of the present invention would not change if one or more components (or elements) were added to or removed from FIG. 14.

The OTDR is a method for identifying problems in the fiber plant. For example, the OTDR emits, applies, and/or pulses a laser light or photon energy on a fiber under the test, and subsequently receives, detects, and/or measures a reflected light on the fiber under the test in response to the emitted laser light. A disruption on a fiber across the fiber path such as a broken fiber can cause a reflection of a transmitted laser light. The time difference from when laser light is transmitted to the time that a reflection of the laser light is detected may help determine the location of the broken fiber for the port under test. Note that a high reflected power may indicate an open connection.

Module 1400 includes a modified test channel circuit or TCT 1402 capable of performing OTDR related functions. TCT 1402 or test channel, in one embodiment, is connected to route and select ROADMs or WSSs 612-614 for providing intra-nodal test. Test signal transceiver or test channel transceiver 616-618 is coupled to line-in amplifier 118 and line output amplifier 120 for testing the expansion OADM configuration. To provide OTDR function, TCT 1402 further includes a two-way switch 1408, a three-way switch 1406, and an optical circulator 1410. Receiver 618 is configured to receive signals reflected back from a line-out fiber via switches 1406-1408 and optical circulator 1410. Three-way switch 1406, in one embodiment, can be configured to include a three-port circulator which includes directional couplers and/or splitters. Note that the OTDR function can be effective for identifying fiber problems when the OADM is configured as a line degree OADM.

TCT 1402, in one embodiment, is configured to provide a dual function of intra-nodal fiber testing using test signals and fiber plant testing with OTDR signals. During an operation of performing an OTDR function, optical two-way switch 1408 is set to be transparent and optical three-way switch 1406 is coupled to port 2 to port 3. Transmitter 616 (or TX laser) pulses an optical signal and the reflected signal of the pulsed optical signal is subsequently measured by the RX or receiver 618. TCT 1402 records the measurement and analyzes the timing and power of the echo based on the measurement. The measurement and/or recorded information can be used for troubleshooting and/or gathering information relating to fiber plant such as fiber lengths or loss. The OTDR function on the line-out fiber port can also be used for characterizing the fiber on the line-in fiber port with additional switches.

The exemplary embodiment of the present invention includes various processing steps, which will be described below. The steps of the exemplary embodiment of the present invention may be embodied in machine or computer executable instructions. The instructions can be used to cause a general purpose or special purpose system, which is programmed with the instructions, to perform the steps of an exemplary embodiment of the present invention. While embodiments of the present invention will be described with reference to the Internet, the method and apparatus described herein is equally applicable to other network infrastructures or other data communications environments.

Figure 15:
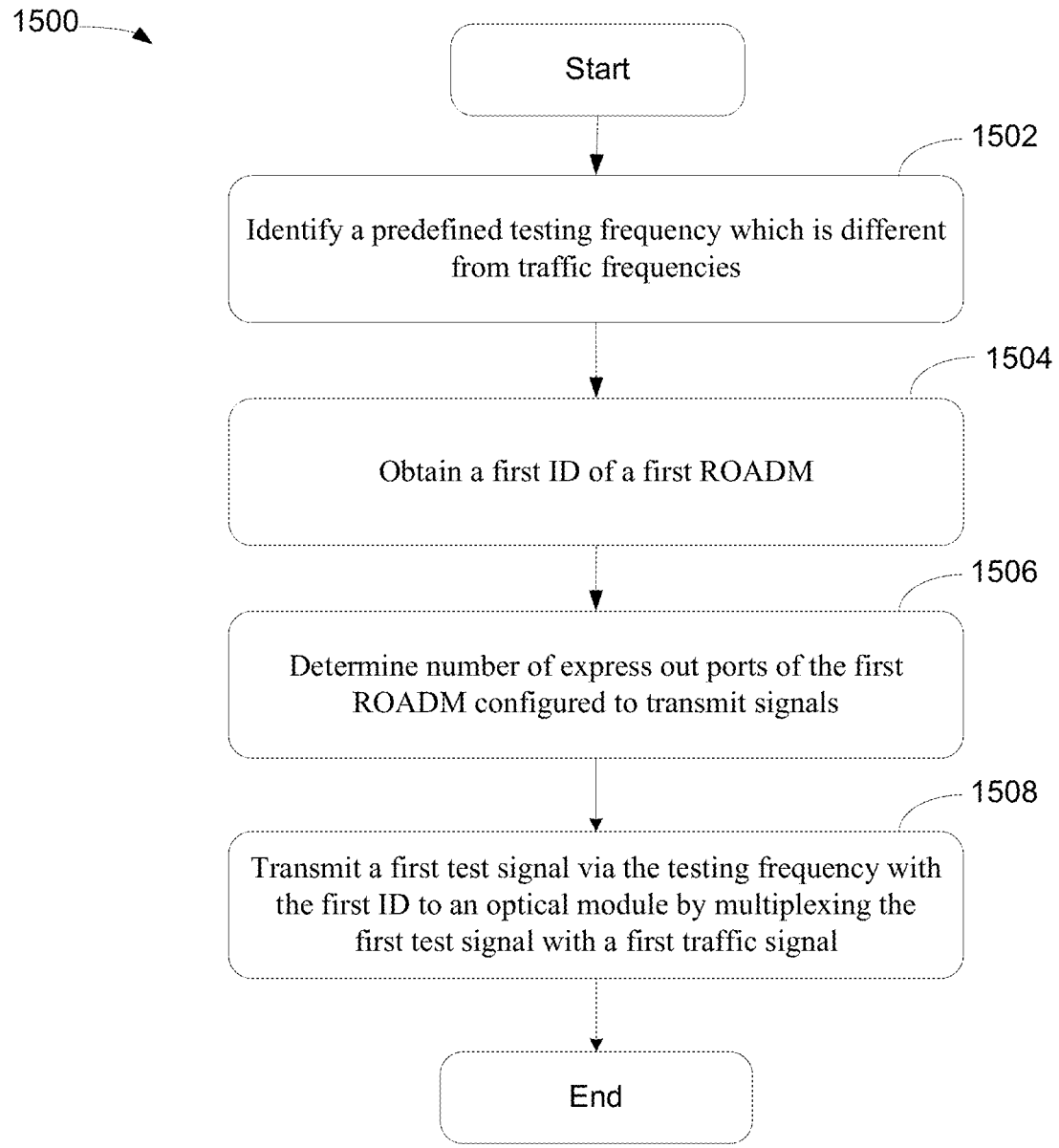
FIG. 15 is a flowchart illustrating an exemplary process of automatically discovering intra-nodal fiber connections using a TCT in accordance with one embodiment of the present invention.

FIG. 15 is a flowchart 1500 illustrating an exemplary process of automatically discovering intra-nodal fiber connections using a TCT in accordance with one embodiment of the present invention. At block 1502, a process capable of discovering fiber connections is able to identify a predefined testing frequency which is different from traffic frequencies at a test module. For example, a transmitter of TCT is able to generate a testing frequency with a wavelength greater or equal to 196.2 THz.

At block 1504, upon obtaining a first ID of a first ROADM module that couples with the test module, a number of express out ports of the first ROADM module configured to transmit signals to one or more add-drop modules is determined at block 1506. At block 1508, the process is capable of transmitting a first test signal via the testing frequency indicating the first ID by multiplexing the first test signal with a first traffic signal at one of the express out ports to broadcast connectivity of the first ROADM module. In one embodiment, the process receives a second test signal indicating connectivity between the first ROADM module and second ROADM module operated in the test signal by a receiver of the test module in the first ROADM module. For example, upon extracting a second ID from the second test signal to identify an express out port associated with the second ROADM module, a connection between the first ROADM module and the second ROADM module is confirmed in accordance with the second test signal and the second ID. After activating a laser by the test module to emit a pulse via a line output port across a fiber, a reflected light is measured in accordance with the pulse for estimating a location of broken fiber.

While particular embodiments of the present invention have been shown and described, it will be obvious to those skilled in the art that, based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A method of discovering fiber connections, comprising:
   identifying a predefined testing frequency which is different from traffic frequencies at a test module;
   obtaining a first identification ("ID") of a first optical module that couples with the test module;
   determining number of express out ports of the first optical module configured to transmit signals to one or more add-drop modules;
   transmitting a first test signal via the predefined testing frequency indicating the first ID by multiplexing the first test signal with a first traffic signal at one of the express out ports to broadcast connectivity of the first optical module;
   receiving a second test signal indicating a connectivity between the first optical module and a second optical module by a receiver of the test module in the first optical module and extracting a second ID from the second test signal to identify an express out port associated with the second optical module; and
   confirming a connection between the first optical module and the second optical module in accordance with the second test signal and the second ID.

2. The method of claim 1, wherein the first and second optical modules are reconfigurable optical add drop multiplexers.

3. The method of claim 1, further comprising activating a laser by the test module to emit a pulse via a line output port across a fiber.

4. The method of claim 3, further comprising measuring time to detect reflected light of the pulse to estimate a location of broken fiber.

5. The method of claim 1, further comprising selecting one of a plurality of optical signals for output.

6. The method of claim 5, further comprising amplifying a selected optical signal for output.

7. The method of claim 1, further comprising routing at least one optical signal for output.

8. A method of discovering fiber connections, comprising:
   identifying a predefined testing frequency which is different from traffic frequencies at a test module;
   obtaining a first identification ("ID") of a first optical module that couples with the test module;
   activating a first wavelength select switch ("WSS") to route input signals and activating a second WSS to select output signals;
   determining number of express out ports of the first optical module configured to transmit signals to one or more add-drop modules;
   transmitting a first test signal via the predefined testing frequency indicating the first ID by multiplexing the first test signal with a first traffic signal at one of the express out ports to broadcast connectivity of the first optical module;
   receiving a second test signal indicating a connectivity between the first optical module and a second optical module by a receiver of the test module in the first optical module and extracting a second ID from the second test signal to identify an express out port associated with the second optical module; and
   confirming a connection between the first optical module and the second optical module in accordance with the second test signal and the second ID.

9. The method of claim 8, further comprising activating a laser by the test module to emit a pulse via a line output port across a fiber.

10. The method of claim 9, further comprising measuring time to detect reflected light of the pulse to estimate a location of broken fiber.

11. The method of claim 8, further comprising amplifying a selected optical signal for output.

12. A method of discovering fiber connections, comprising:
   identifying a predefined testing frequency which is different from traffic frequencies at a test module;
   obtaining a first identification ("ID") of a first optical module that couples with the test module;
   determining number of express out ports of the first optical module configured to transmit signals to one or more add-drop modules;
   transmitting a first test signal via the predefined testing frequency indicating the first ID by multiplexing the first test signal with a first traffic signal at one of the express out ports to broadcast connectivity of the first optical module;

receiving a second test signal indicating a connectivity between the first optical module and a second optical module by a receiver of the test module in the first optical module;

extracting a second ID from the second test signal to identify an express out port associated with the second optical module; and confirming a connection between the first optical module and the second optical module in accordance with the second test signal and the second ID.

13. The method of claim 12, further comprising:

activating a laser by the test module to emit a pulse via a line output port across a fiber.

14. The method of claim 13, further comprising measuring time to detect reflected light of the pulse to estimate a location of broken fiber.

15. The method of claim 12, further comprising selecting one of a plurality of optical signals for output.

16. The method of claim 12, further comprising amplifying a selected optical signal for output.

17. The method of claim 12, further comprising routing at least one optical signal for output.

* * * * *